US012790725B2

(12) United States Patent
Kang et al.

(10) Patent No.: US 12,790,725 B2
(45) Date of Patent: Nov. 10, 2026

(54) GRAPHITIZATION OF ELECTROSPUN POLYIMIDE NANOFIBER

(71) Applicant: GEORGE MASON UNIVERSITY, Fairfax, VA (US)

(72) Inventors: Pilgyu Kang, Fairfax, VA (US); Shirin Movaghgharnezhad, Fairfax, VA (US)

(73) Assignee: GEORGE MASON UNIVERSITY, Fairfax, VA (US)

( * ) Notice: Subject to any disclaimer, the term of this patent is extended or adjusted under 35 U.S.C. 154(b) by 218 days.

(21) Appl. No.: 18/406,060

(22) Filed: Jan. 5, 2024

(65) Prior Publication Data

US 2024/0240365 A1 Jul. 18, 2024
US 2025/0122650 A2 Apr. 17, 2025

Related U.S. Application Data

(60) Provisional application No. 63/437,767, filed on Jan. 9, 2023.

(51) Int. Cl.

| | |
|---|---|
| ***D01F 9/24*** | (2006.01) |
| ***C08G 73/10*** | (2006.01) |
| ***D01D 5/00*** | (2006.01) |
| ***D01F 6/74*** | (2006.01) |
| ***D06M 10/00*** | (2006.01) |
| ***D06M 101/30*** | (2006.01) |
| ***H01G 11/24*** | (2013.01) |
| ***H01G 11/32*** | (2013.01) |

(52) U.S. Cl.

CPC ........... *D01F 9/24* (2013.01); *C08G 73/1028* (2013.01); *C08G 73/1067* (2013.01); *D01D 5/003* (2013.01); *D01F 6/74* (2013.01); *D06M 10/005* (2013.01); *H01G 11/24* (2013.01); *H01G 11/32* (2013.01); *D06M 2101/30* (2013.01); *D10B 2331/14* (2013.01); *D10B 2505/00* (2013.01)

(58) Field of Classification Search

CPC .......................................... H01G 11/24–11/40
See application file for complete search history.

(56) References Cited

U.S. PATENT DOCUMENTS

| | | | | |
|---|---|---|---|---|
| 3,356,648 | A * | 12/1967 | Rogers | C08G 73/1039 528/229 |
| 10,935,645 | B2 | 3/2021 | Sikdar et al. | |
| 2004/0166311 | A1* | 8/2004 | Yang | D04H 1/728 264/210.8 |
| 2014/0206947 | A1 | 7/2014 | Isserow | |
| 2017/0062821 | A1* | 3/2017 | Tour | C01B 32/184 |

(Continued)

FOREIGN PATENT DOCUMENTS

JP 2005165256 A 6/2005

OTHER PUBLICATIONS

Ye, Ruquan; "Laser Induced Graphene"; American Chemical Society 2018, 51, 1609-1620 (Year: 2018).*

(Continued)

*Primary Examiner* — Jennifer A Steele
(74) *Attorney, Agent, or Firm* — Ballard Spahr LLP

(57) ABSTRACT

Laser fabricated graphene fiber which can be prepared from a fluorinated polyimide fiber is disclosed. The graphene fiber exhibits an ultrahigh specific surface area, facilitating excellent electrochemical properties, useful for example in tranducers, capacitors, and micro-supercapacitors.

6 Claims, 18 Drawing Sheets

(56) References Cited

U.S. PATENT DOCUMENTS

2018/0113205 A1 4/2018 Sikdar et al.
2021/0321975 A1 10/2021 Sikdar et al.

OTHER PUBLICATIONS

Duy, "Laser-Induced Graphene Fibers" Elsevier; Carbon; www.elsevier.com/locate/carbon; Carbon 126 (2018) 472-479 (Year: 2018).*
Acoustic Output Measurement Standard for Diagnostic Ultrasound Equipment, Revision 3. In: National Electrical Manufacturers Association (2009).
AIUM. "Recommeded Maximum Scanning Times for Displayed Thermal Index (TI) Values", http://www.aium.org/officialstatements/65. (2016) Accessed May 6, 2018.
Akhlaghi, N. et al. "Novel Use of Ultrasound Imaging to Decode Activity of Forarm Muscles for Upper Extremity Prosthetic Control", *The Journal of Acoustical Society of America* (2015) 137(4), pp. 2425-2425.
Akhlagni, N. et al. "Sparsity Analysis of a Sonomyographic Muscle-Computer Interface", (2019) *IEEE Transactions on Biomedical Engineering*.
Akhlagni, N. et al. "Real-time Classification of Hand Motions Using Ultrasound Imaging of Forearm Muscles", *IEEE Transactions of Biomedical Engineering* (2015) 63(8), pp. 1687-1698.
AlMohimeed, I. et al. "Wearable Ultrasonic Sensor Using Double-Layer PVDF Films for Monitoring Tissue Motion", (2018) *IEEE Canadian Conference on Electronic & Computer Engineering*.
Alshiek, J. et al. "Ultrasongraphic Age-Related Changes of the Pelvic Floor Muscles in Nulliparous Women and Their Association with Pelvic Floor Symptoms: A Pilot Study", *Neurourology and Urodynamics* (2019).
Baker, CA et al. "Photoacoustic Imaging of Muscle Oxygenation During Exercise", *The Journal of the Acoustical Society of America* (2016) 139(4), pp. 2176-2716. Abstract only.
Barnett, S.B. et al. "International Recommendations and Guidelines for the Safe Use of Diagnostic Ultrasound in Medicine", *Ultrasound in medicine & biology* (2000) 26(3), pp. 355-366.
Basu, A. et al. *ACS Appl. Mater. Interfaces* (2016) 8, 31841.
Bird, M. et al. "Characterization of Local Muscle Fiber Anisotrophy Using Shear Wave Elastography in Patients with Chronic Myofascial Pain", *IEEE International Ultrasonics Symposium* (2017).
Bock, N. et al. *Prog. Polym. Sci.* (2012) 37, 1510.
Chiang, Y.-P. et al. *Journal of Medical Ultrasound* (2013) 21(1), pp. 1-8.
Chyan, Y. et al. *ACS Nano* (2018) 12, 2176.
Cronin, N.J. et al. "Ultrasonography as a Tool to Study afferent feedback from the Muscle Tendon Complex During Human Walking", *Journal of Electromyography and Kinesiology* (2011) 21(2), pp. 197-207.
Cronin, N.J. et al. "Differences in Contractile Behavious Between the Soleus and Medial Gastrocnemius Muscles During Human Walking", *Journal of Experimental Biology* (2013) 215(5), pp. 909-914.
Dhawan, A. S. et al. "Proprioceptive Sonolyographic Control: A Novel Method for Intuitive and Proportional Control of Multiple Degrees-of-Freedom for Individuals with Upper Extremity Limp Loss", *Scientific Reports* (2019) 9(1), pp. 1-15.
Ding, Y. et al. *Prog. Polym. Sci.* (2016) 61, 67.
Dodda, J. M. et al. *J. Macromol. Sci. Part B* (2015) 54, 629.
Duy, L. X. *Carbon N. Y.* (2018) 126, 472.
El-Kady, M. F. et al. *Science* (80-.) (2012) 335, 1326.
El, Kady, M. F. et al. *Nat. Commun.* (2013) 4, 1475.
Frank, A.J. et al. "Orthopedic Injuries Before Combat Deployment—Will the Soldiers Be Ready for Combat When Their Unit Is Called Upon?", *Military Medicine* (2011) 176(9), pp. 1015-1018.
Friedman, A. K. et al. *J. Electrochem. Soc.* (2018) 165, H733.
Gao, J. *Sensors* (2021) 21, 2018.
Gao, W. et al. *Nat. Nanotechnol.* (2011) 6, 496.
Getachew, B. A. et al. *ACS Appl. Mater. Interfaces* (2020) 12, 48511.
Ghoreishian, S. M. et al., *Chem. Eng. J.* (2021) 419, 129530.
Harris, GR et al. "Comparison of Thermal Safety Practice Guidelines for Diagnostic Ultrasound Exposures", *Ultrasound Med Biol.* (2016) 42(2), pp. 345-357.
Hart, J.M. et al. *Journal of athletic training* (2010) 45(1), pp. 87-97.
Hasegawa, M. et al. *Prog. Polym. Sci.* (2001) 26, 259.
He, Y. et al. *RSC Adv.* (2014) 4, 59936.
Hou, L. et al. *Adv. Funct. Mater.* (2018) 28, 1801114.
Ichinose, Y. et al. "In vivo Estimation of Contraction Velocity of Human Vastus Lateralis Muscle During "Isokinetic" Action", *Journal of Applied Physiology* (2000) 88(3), pp. 851-856.
Ishii, J. et al. *Eur. Polym. J.* (2010) 46, 681.
Jung, K.-H. et al. *Carbon N. Y.* (2012) 50, 5309.
Kang, P. et al. "Crumpled Graphene Photodetector with Enhanced, Strain-Tunable, and Wavelength-Selective Photoresponsivity", *Advanced Materials* (2016) 28(23), pp. 4639-4645.
Kaspar, P. et al. *Materials* (*Basel*) (2021) 14, DOI 10.3390/ma14061428.
Kim, C. et al. *Appl. Phys. Lett.* (2003) 83, 1216.
Kim, M. et al. *ACS Appl. Energy Mater.* (2021) 4, 208.
Kim, M. et al. *Carbon N.Y.* (2020) 164, 349.
Kim, M. et al. "A Stretchable Crumpled Graphene Photodetector with Plasmonically Enhanced Photoresponsivity", *Nanoscale* (2017) 9(12), pp. 4058-4065.
Kong, Y.K. et al. *J. Electromyogr Kinesiol* (2010) 26(6), pp. 1223-1229.
Lahcen et al. *Bioscens.Bioelectron.*(2020) 168, 112565.
Lee, B.-S. et al. *Funct. Compos. Struct.* (2020) 2, 12001.
Li, L. et al. *Adv. Mater.* (2016) 28, 838.
Lin, J. et al. *Nano Lett.* (2013) 13, 72.
Liaw, D.-J. et al. *Prog. Polym. Sci.* (2012) 37, 907.
Lin, J. et al. *Nat. Commun.*(2014) 5, 5714.
Lin, J. et al. *Nano Lett.* (2012) 13, 72.
Menaa, F. et al. *Faraday Discuss* (2011) 149, 269.
Merrigan, J.J. et al. *Journal of Strength and Conditioning Research* (2021).
Movaghgharnezhad, Shirin et al. "Ultrasensitive and Broadband Flexible Photodetectors Based on Three-dimensional Porous Graphene", Powerpoint Presentation, Material Research Society (MRS), Dec. 1, 2021.
Movaghgharnezhad, Shirin et al. "Highly Sensitive Photodetector based on Laser-generated Graphene with 3D Heterogeneous Multiscale Porous Structures", Manuscript, Nov. 15, 2022.
Nadzalan, A. M. et al. *Human Movement* (2018) 19(1), pp. 44-50.
Najafi, F. et al. *Int. Nano Lett.* (2015) 5, 187.
Nayak, P. et al. *Adv. Electron. Mater.* (2016) 2, 1600185.
Niu, H. et al. *Electrospun Polym. Compos.*, (2021) Woodhead Publishing, pp. 641-688.
Patwardhan, S. et al. "Evaluation of the Role of Proprioception During Proportional Position Control Using Sonomyography: Applications in Prosthetic", *IEEE 16th International Conference on Rehabilitation Robotics* (*ICORR*) (2019).
Peng, Z. et al. *ACS Appl. Mater. Interfaces* (2015), 7, 3414.
Qiu, S. et al. *IEEE Transactions on Neural Systems and Rehabilitation Engineering* (2016) 25(1), pp. 62-70.
Rajendran, S.K. et al. *Dynamic Systems and Control Conference* (2018) American Society of Mechanical Engineers.
Ravi, S. et al. *J. Ind. Eng. Chem.* (2018), 67, 210.
Rostaminia, G. et al. "Posterior Perineal Translevator Hernia: Application of MRI, 3D Ultrasound, and Computerized Modeling", *International Urogynecology Journal* (2018) 29(10), pp. 1559-1561.
Safavyina, S. et al. *Topics in Spinal Cord Injury Rehabilitation* (2011) 17(1), pp. 16-24.
Sandercock, T.G. et al. *Journal of Biomechanics* (2018) 81, pp. 45-51.
Samyn, P. et al. *J. Mater. Eng. Perform.* (2006) 15, 750.
Selatile, K. et al. *ACS Omega* (2021) 6, 21005.

(56) References Cited

OTHER PUBLICATIONS

Sikdar, S. et al. "Novel Applications of Ultrasound Technology to Visualize and Characterize Myofascial Trigger Points and Surrounding Soft Tissue", *Archives of Physical Medicine and Rehabilition* (2009) 90(11), pp. 1829-1838.
Sikdar, S. et al. "Dynamic Ultrasound Imaging Applications to Quantify Musculoskeletal Function", *Exercise and Sport Sciences Reviews* (2014) 42(3), p. 126.
Singh, S.P. et al. *ACS Nano* (2018) 12, 289.
Snapp, P. et al. "Colloidal Photonic Crystal Strain Sensor Integrated with Deformable Graphene Phototransducer", *Advanced Functional Materials* (2019) 1902216.
Tarbox, E. et al. "Low_power Ultrasound Imaging Systems Using Time Delay Spectrometry", *IEEE International Ultrasonics Symposium IUS*) (2017).
Tian, G. et al. *Polym. Sci. Ser. A* (2014) 56, 505.
Tobias, R.J. et al. *IEEE International Ultrasonics Symposium* (2014).
Turo, D. et al. "Novel Use of Ultrasound Elastography to Quantify Muscle Tissue Changes After Dry Needling of Myofascial Trigger Points in Patients with Chronic Myofascial Pain", *Journal of Ultrasound in Medicine* (2015) 34(12). pp. 2149-2161.
Wang, C. et al. *Molecules* (2019) 24, 834.
Wang, F. et al. *Mater. Technol.* (2018) 33, 340.
Wang, Z.-L., et al. *ACS Nano* (2013) 7, 2422.
Wei, Q. et al. "Patient-Specific Studies of Pelvic Floor Biomechanics Using Imaging In Practical Pelvis Floor Ultrasonography" *Springer* (2017) pp. 337-344.
Wu, Z. S. et al. *Nat. Commun.* (2013) 4, 1.
Xing, Q. et al. "A Multi-stage, Multi-resolution, and multi-volumes-of-interest Volumes Registration Method Applied to 3D Endovaginal Ultrasound", *PloS one* (2019) 14(11).
Xu, Y. *Nano Res.* (2021) 14, 3033.
Yang, Y. et al. *Nat. Biotechnol.* (2020) 38, 217.
Yang, Y. et al. *Polym. Eng. & Sci.* (2013) 53, 1536.
Yano, K. et al. *J. Polym. Sci. Part A Polym. Chem.* (1993) 31, 2493.
Ye, R. et al. *Adv. Mater.* (2019) 31, 1803621.
Yu, W. et al. *ACS Appl. Mater. Interfaces* (2017) 9, 4597.
Zambraski, E. J. et al. "Prevention and Rehabilitation of Musculoskeletal Injuries During Military Operations and Training", *The Journal of Strength & Conditioning Research* (2012) 26, pp. S101-S106.
Zangabad, RP et al. "A Kerfless PVDF Array for Photoacoustic Imaging" (2018) *IEEE International Ultrasonics Symposium.*
Zhao, J. et al. *IEEE Transactions on Ultrasonics, Ferroelectrics, and Frequency Control* (2022), pp. 1-1.
Zou, KH et al. "Statistical Validation of Image Segmentation Quality Based on Spatial Overlap Index", *Acad Radiol* (2004) 11(2), pp. 178-189.
Kim, M., Gu, M.G., Jeong, H., Song, E., Jeon, J.W., Huh, K.M., Kang, P., Kim, S.K., Kim, B. G., 2020. "Laser Scribing of Fluorinated Polyimide Films to Generate Microporous Structures for High-Performance Micro-supercapacitor Electrodes," ACS Appl. Energy Mater. (2021) 4, 1, pp. 208-214.

* cited by examiner (c)

(b)

GRAPHITIZATION OF ELECTROSPUN POLYIMIDE NANOFIBER

CROSS-REFERENCE TO RELATED APPLICATIONS

This application claims priority to U.S. Provisional Application No. 63/437,767, filed Jan. 9, 2023, which is incorporated into this application by reference.

BACKGROUND

Nanostructured graphene-based materials have been studied due to their unique properties including large specific surface area, high electrical conductivity, excellent electrochemical properties, and high thermal and chemical stability. Nanostructuring of graphene via constructing three-dimensional (3D) porous morphologies allows for graphene-based nanomaterials with new functionalities in a wide range of applications such as optoelectronics, electrochemical sensing, and energy storage applications. Despite many advantages of the material, improvements related to surface area and electrochemical properties are needed in the art.

SUMMARY

An aspect of this disclosure relates to the formation of laser-induced graphene fiber ("LIGF") from electrospun fluorinated polyimide ("fPI") nanofibers ("NFs"). Embodiments utilize a combination of electrospinning and photothermal laser graphitization techniques to prepare graphene fiber with very high specific surface area and excellent electrochemical properties. In addition, compared to graphene prepared from a polyimide fibers, the fPI NFs are white-colored, which offers another advantage. The disclosed materials are well characterized and demonstrate potential for use as a tranducer, for example a capacitative tranducer, or specifically in some embodiments as a microsupercapacitor with enhanced areal capacitance.

In one aspect, disclosed is a method for making a graphene fiber, comprising graphitizing a fluorinated polyimide fiber which has at least one aromatic ring under conditions to form the graphene fiber.

Also described is a graphene fiber prepared from a fluorinated polyimide fiber which has at least one aromatic ring. Also described is a capacitor having a first electrode comprising a graphene fiber prepared from a fluorinated polyimide fiber having at least one aromatic ring.

BRIEF DESCRIPTION OF THE DRAWINGS

The foregoing summary, as well as the following description of the disclosure, is better understood when read in conjunction with the appended drawings. For the purpose of illustrating the disclosure, the drawings illustrate some, but not all, alternative embodiments. This disclosure is not limited to the precise arrangements and instrumentalities shown. The following figures, which are incorporated into and constitute part of the specification, assist in explaining the principles of the disclosure.

DETAILED DESCRIPTION

Figure 1:
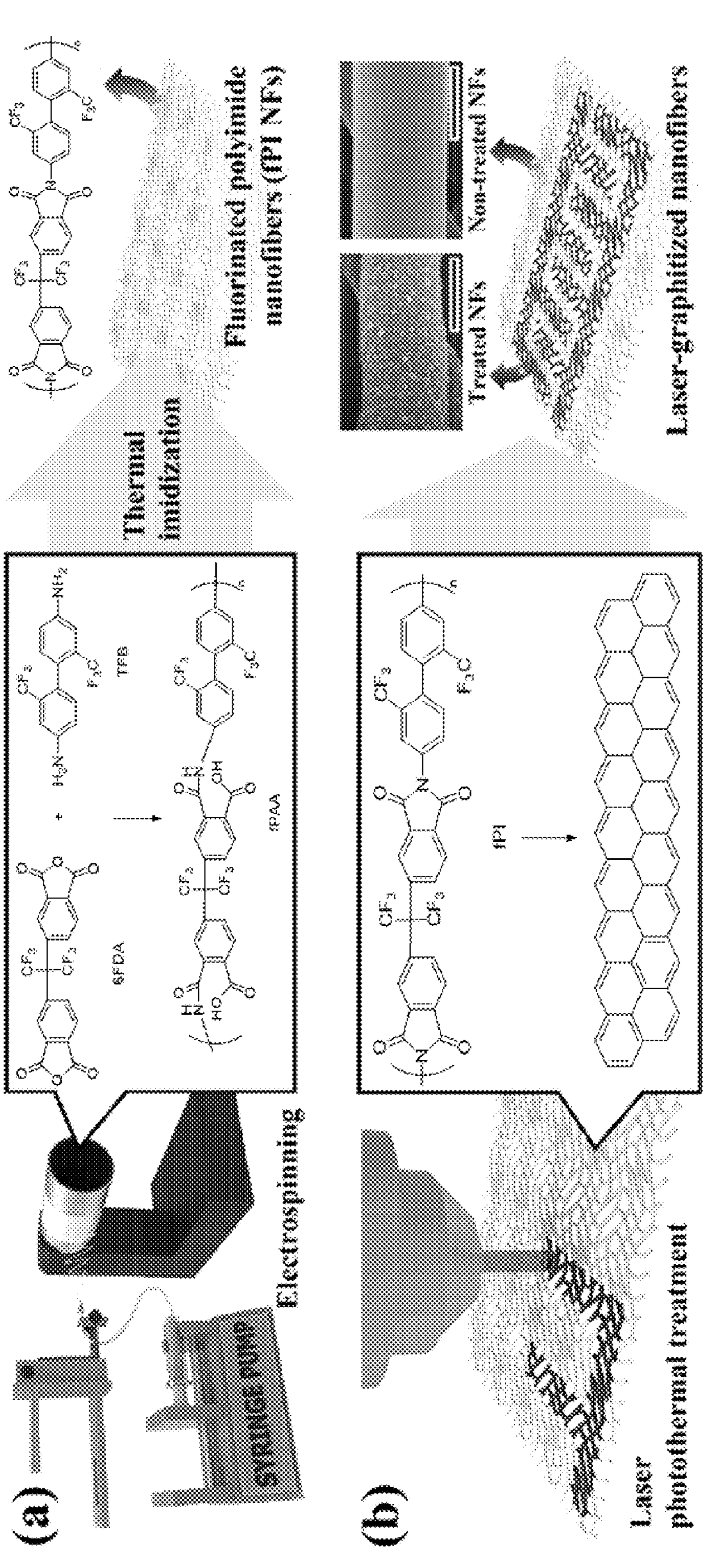
FIG. 1 shows a schematic illustration of the fabrication of fPI NFs and LIGF. In step a), fPI NFs are synthesized through electrospinning fluorinated poly(amic)acid nanofibers followed by thermal imidization. In step b), LIGF is fabricated through photothermal laser treatment. Not shown in the resulting graphene is residual fluorines which may be present as discussed below.

Polyimide, an engineering plastic, is a polymer with an imide ring in the main chain and a mostly amorphous structure. Owing to the solid chain structure and interchain π-π interaction of the imide-based aromatic group of polyimides, polyimide possesses excellent heat, chemical, and mechanical resistance. Polyimide has a distinctive dark brown color due to the formation of charge transfer complexes (CT-complex). CT-complex refers to the transition of π-electrons produced by the interaction of an imide chain. Reduction of CT-complex is an important factor to remove the brown color. The disclosed methods effectively achieve this end by introducing a strong electronegativity element of trifluoromethyl ($—CF_3$) into the main chain of a polyimide to reduce the density of π-electrons and produce the transparent fluorinated polyimide with excellent transmittance.

Electrospinning and other techniques are further used to generated high performance graphene nanofibers.

I. GRAPHENE NANOFIBERS AND DEVICES COMPRISING SAME

In general, the disclosed graphene fibers are prepared from a fluorinated polyimide fiber which has at least one aromatic ring. Graphitization significantly reduces the amount of fluorine on the fiber, but in some embodiments, the graphene fiber may have residual fluorine from the fluorinated polyimide polymer.

In some aspects, the graphene fibers have a high specific surface area. In one embodiment, the graphene fiber has nanopores with (i) an average pore size of less than 100 nm and (ii) a BET specific surface area of at least 300 $m^2/g$. The graphene fiber may also have a structure including one or more of the following pore structures: macropores having an average pore size exceeding 50 nm; mesopores having an average pore size of 2-50 nm; or micropores having an average pore size of 2 nm or less.

The nanopores of the graphene fibers in some aspects can provide for a high or even ultra high specific surface area, measured by the BET method which is known in the art. In some aspects, the nanopores of the graphene fiber have a BET specific surface area of at least 300 $m^2/g$. In a further aspect, the nanopores of the graphene fiber have a BET specific surface area of at least 400 $m^2/g$. In a further aspect, the nanopores of the graphene fiber have a BET specific surface area of at least 500 $m^2/g$. In a further aspect, the nanopores of the graphene fiber have a BET specific surface area of at least 600 $m^2/g$. In a further aspect, the nanopores of the graphene fiber have a BET specific surface area of at least 700 $m^2/g$. In a further aspect, the nanopores of the graphene fiber have a BET specific surface area of at least 800 $m^2/g$. In a further aspect, the nanopores of the graphene fiber have a BET specific surface area of at least 900 $m^2/g$.

In a further aspect, the nanopores of the graphene fiber have a BET specific surface area of at least 1,000 $m^2/g$. In a further aspect, the nanopores of the graphene fiber have a BET specific surface area of at least 1,200 $m^2/g$. The upper limit for any of these threshold BET specific surface areas can vary, for example, 1,500 $m^2/g$ or in some aspects, 1,400 $m^2/g$. In one aspect, the nanopores of the graphene fiber have a BET specific surface area of about 1,310 $m^2/g$, "about" in this instance implying plus or minus 10 $m^2/g$.

In a further aspect, the graphene fiber exhibits a Horvath-Kawazoe pore volume of at least 0.2 $cm^3/g$. For example, the graphene fiber can exhibit a Horvath-Kawazoe pore volume of at least 0.25 $cm^3/g$, at least 0.3 $cm^3/g$, at least 0.35 $cm^3/g$, at least 0.4 $cm^3/g$, or at least 0.5 $cm^3/g$. The upper limit for any of these pore volumes can vary, e.g., 0.8 $cm^3/g$, 0.7 $cm^3/g$, 0.6 $cm^3/g$, or 0.55 $cm^3/g$.

The described graphene fiber exhibits a high degree of graphitization as is evident from a number of characteristics. In one aspect, the graphene fiber has a mean graphene interlayer spacing of 0.35-0.45 nm, e.g., 0.36 nm. In some aspects as briefly discussed above, the graphene fiber may include flourine atoms as a result of one exemplary method of making the graphene fiber described below which uses fluorinated polymide fibers as a precursor (e.g. graphitization is performed on fluorinated polymide fibers). The flourine atoms may be disposed in the graphene sheets of the graphene fiber. The flourine atoms may form C—F bonds and/or C—$F_2$ bonds in the graphene fiber. Additional details on the aspects of the graphene can be found in U.S. patent application Ser. No. 18/520,858, titled "Highly Microporous Laser-Fabricated Graphene," and U.S. patent Application Ser. No. 18/532,214, titled "Highly Microporous Graphene-Based Neural Electrode," both of which are incorporated into this application by reference in their entireties, including for teachings concerning graphene, its method of making, and resultant physical and chemical properties.

Also disclosed are devices comprising the graphene nanofibers, including nanofibers made according to the methods described below, or nanofibers as described above made by any suitable method. In one example, a disclosed capacitor can have a first electrode comprising the graphene fiber prepared from the fluorinated polyimide fiber having at least one aromatic ring. In one embodiment, the first electrode is configured interdigitally with a second electrode (see, e.g., FIGS. 4A-4B). This configuration is useful in a device known as a micro-supercapacitor (MSC), which in addition to the electrode will also generally comprise additional layers such as a substrate, conductive or dielectric layers, insulating layers, and in some embodiments a solid or liquid electrolyte (see, e.g., FIG. 4A).

II. METHOD OF MAKING GRAPHENE NANOFIBERS

Although the above-described graphene fiber and devices comprising the fiber are not limited in scope to any particular production method, various properties were surprisingly determined to be influenced by a method of manufacture. In some aspects, the graphene fiber can be prepared by graphitizing a fiber of a fluorinated polyimide which has at least one aromatic ring. During graphitization, discharge of fluorine-based gas products, in addition to other gaseous products, was surprisingly discovered to result in a porous structure that is particularly amenable for electronic applications such as tranducers, capacitors, and in some aspects micro-supercapacitors.

The fluorinated polyimide is not limiting provided it is capable of being graphitized, generally meaning it will have at least one aromatic ring, and provided it has at least one fluorine group. As discussed above, at least part of the fluorine will be released during graphitization to provide for unique porous structures and in turn optical properties.

In one aspect, the fluorinated polyimide of the fluorinated polyimide fiber has one of the following repeating units:

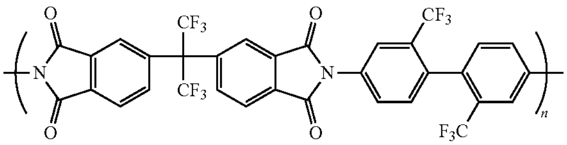
,

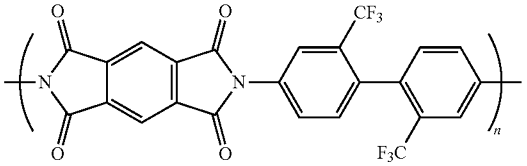
, or

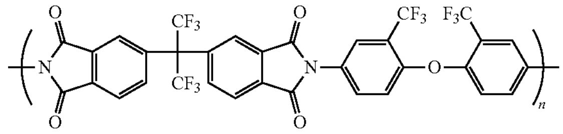
, where each instance of n is independently an integer that is at least two. A variety of molecular weights beyond dimers are contemplated, typically only limited by the ability in some aspects to prepare fiber from a precursor fiber or otherwise process the polyimide fiber into a graphene fiber. In some aspects, the fluorinate polyimide such as those with the repeating structure above can have a number average molecular weight ($M_n$) of 1,000 g/mol to 100,000 g/mol, e.g., 10,000 g/mol to 100,000 g/mol.

Graphitization of the fluorinated polyimide fiber can be accomplished through a variety of methods. One example is laser irradiation of the fluorinated polyimide fiber. For example, irradiating can be performed with a $CO_2$ infrared laser, e.g., having a wavelength (λ) of 10.6 μm. In a specific aspect, irradiating can be performed at 1-2.5 Watts, e.g., greater than 1.2 Watts and less than 2.4 Watts, such as about 1.8 Watts for instance. Irradiation can also be performed with 1,000 laser pulses per inch (PPI), and at a speed of 3-4 inches per second, e.g., 3.5 inches per second, for example with a $CO_2$ infrared laser, e.g., having a wavelength (λ) of 10.6 μm.

In some aspects, the fluorinated polyimide fiber can be prepared by thermal imidization of a precursor polyamic acid fiber. The precursor polyamic acid fiber can be conveniently prepared by electrospinning the fiber from a solution of the polyamic acid. In some aspects, the solution comprises greater than 5% by weight of the polyamic acid. In a further aspect, the solution comprises greater than 10% by weight of the polyamic acid. In a further aspect, the solution comprises greater than 15% by weight of the polyamic acid. In a still further aspect, the solution comprises 15-25% by weight of the polyamic acid, for example, about 20% by weight of the polyamic acid.

The polyimide fibers comprising a polyimide having one of the repeating units shown above can be prepared by ring closing or thermal imidization of the corresponding polyamic acid. The polyamic acids corresponding to the polyimide structures shown above have one of the following repeating units:

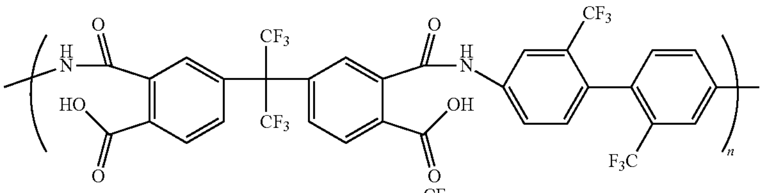
,

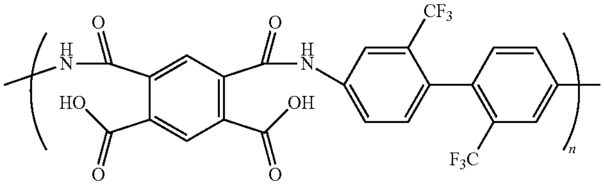
, or

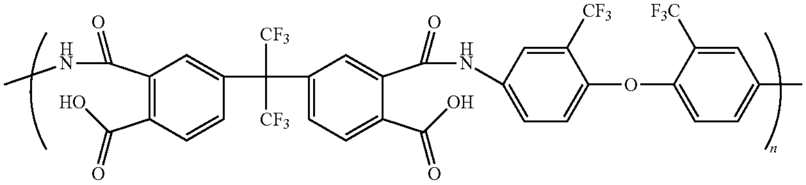
, where each instance of n is independently an integer that is at least two. Contemplated molecular weights will be in the same range as those described above with respect to the exemplary polyimides.

In one aspect, the disclosed graphene fibers are nanofibers, e.g., nanofibers having a diameter of 500-1,500 nm. Prior to graphitization, the polyimide fibers also generally can have a diameter of 500-1,500 nm.

III. EXAMPLES

The following examples further illustrate this disclosure. The scope of the disclosure and claims is not limited by the scope of the following examples.

A. Materials 4,4'-(Hexafluoroisopropylidene) diphthalic anhydride (6FDA; $C_{19}H_6F_6O_6$, 99.0%) was purchased from Sigma-Aldrich Chemicals (MO, USA). 2,2'-Bis(trifluoromethyl) benzidine (TFB; $C_{14}H_{10}F_6N_2$, >98.0%) was obtained from TCI chemicals (Japan). Finally, N,N-Dimethylacetamide (DMA; $C_4H_9NO$, ≥99.5%) was purchased from Daejung Chemicals (Republic of Korea).

B. Fabrication of fPI NFs Through Electrospinning and Thermal Imidization

Fluorinated poly(amic)acid solution is a precursor of fPI NFs which was prepared with the following steps: First, 0.1 mol of TFB was mixed in 32.6 mL DMA and stirred at room temperature under an $N_2$ atmosphere until the colorless solution was formed, indicating it was homogeneous. Afterward, 0.1 mol of 6FDA was additionally mixed into the colorless solution in an ice bath, in which the color of the solution initially changed to yellow, and the mixture was stirred for 1 hour under the $N_2$ atmosphere to form a highly viscous colorless solution. Subsequently, the mixture was vigorously stirred overnight at room temperature, and 20 wt. % fluorinated poly(amic)acid solution was prepared for electrospinning.

The homogeneous fluorinated poly(amic)acid solution was used to synthesize fluorinated poly(amic)acid nanofibers using horizontal electrospinning with a high-voltage supply (Nano NC, Republic of Korea) and a syringe pump (Legato 100, KD Scientific, USA). Under a flow rate of 0.5 mL $h^{-1}$ with an applied voltage of 12.0 kV and 21-gauge injection needles, the electrospun nanofibers were collected in an aluminum foil-covered collector held 20.0 cm from the needle. The fabricated NFs were then dried at 70.0° C. in an oven overnight to remove any residual liquids. Lastly, fPI NFs were formed after thermal imidization of fluorinated poly(amic)acid nanofibers in a vacuum oven at 250° C. for 2 hours.

C. Laser Graphitization of Polyimide Nanofibers

A 10.6 μm $CO_2$ laser-cutter system (VLS2.30, Universal Laser Systems, USA) was utilized for synthesizing laser graphitized nanofibers from the electrospun fluorinated polyimide nanofibers at a laser power of 1.8 W, the scan speed of 3.5 in $s^{-1}$, and 1000 PPI. The pulse duration was fixed at ~14 μs and the laser treatment was performed under ambient conditions. It is understood that other laser types, wavelengths, laser powers, and pulse sequences may be used to fabricate the 3D porous graphene.

D. Characterization of the LIGF i. Material Characterization

The morphological characterization of LIGF was analyzed through an optical microscope (Cascade MPS150, Formfactor, USA), high-resolution scanning electron microscopy (HR-SEM; SU8010, Hitachi, Japan), and field-emission transmission electron microscopy (FE-TEM; JEM2100F, JEOL, Japan). The chemical structure and molecular interaction of LIGF were further analyzed using Raman spectroscopy (RAON-Spec, NOST, Republic of Korea) and Fourier-transform infrared spectroscopy (FT-IR; JASCO FT-IR 6600, Japan) in the range of 400-4000 $cm^{-1}$. The crystalline structure of LIGF was analyzed using high-resolution X-ray diffraction (HR-XRD; X'Pert-PRO MRD, Philips, Netherlands), while X-ray photoelectron spectroscopy (XPS) measurements were performed on a Thermo Fisher Scientific K-alpha system (USA) to confirm the chemical composition and the chemical states of LIGF. Finally, thermal stability was measured through thermogravimetric analysis (TGA; TG209F3, Netzsch, Germany).

ii. Electrochemical Characterization

Cyclic voltammetry and galvanostatic cyclic charge measurements were performed using a Gamry Reference 1010B potentiostat (USA) in a two-electrode system. All measurements were conducted using aqueous electrolytes (1 M $H_2SO_4$) in ambient conditions. To ensure the full ions diffusion onto the LIGF interface, the microsupercapacitors were soaked in electrolyte for 2 hours before measurements. The areal capacitance ($C_A$ in mF $cm^{-2}$) from the CV curves was calculated using Equation 1:

$$C_A = \frac{1}{2 \times A_{electrode} \times S \times (V_f - V_i)} \int_{V_i}^{V_f} I(V)dV \quad (1)$$

where $A_{electrode}$ is the surface area of active electrodes (in $cm^2$) with 0.6 $cm^2$ for the devices used in this work; S is the voltage sweep rate (in V $s^{-1}$); $V_f$ $V_i$ are the potential limits of CV curves;

$$\int_{V_i}^{V_f} I(V)dV$$

is the integrated area from CV curves. The areal capacitance ($C_A$ in mF $cm^{-2}$) based on CC curves were calculated using Equation 2:

$$C_A = \frac{I}{A_{electrode} \times \left(\frac{\Delta V}{\Delta t}\right)} \quad (2)$$

where I is the discharge current (in amperes) and ΔV/Δt is the slope of the discharge curve. The areal energy density and areal power were quantified using Equations 3 and 4:[1,50]

$$E_A = \frac{1}{2} \times C_A \times \frac{(\Delta V)^2}{3600} \quad (3)$$

$$P_A = \frac{E_A}{\Delta t} \times 3600 \quad (4)$$

where $\Delta V = V_{max} - V_{drop}$ is the discharge potential range, $V_{max}$ is the maximum voltage (1 V), $V_{drop}$ is the voltage drop from the difference of the first two data points in the discharge curves, and Δt is discharge time (in $s^{-1}$).

E. Results and Discussion

LIGF was fabricated via three steps (FIG. 1): fabricating uniformly sized fluorinated poly(amic)acid nanofibers through electrospinning technology, the synthesis of fPI NFs by thermal imidization, and photothermal laser process on fPI NFs. Initially, fPI NFs were produced through both electrospinning and thermal imidization (Step (a) in FIG. 1). Direct synthesis of fPI NFs through electrospinning is not possible as the ordered structure of molecules is destroyed without the imidization process under a high temperature. The fluorinated poly(amic)acid nanofiber was converted to fPI NFs after imidization in a vacuum oven at 250° C. for 2 hours. LIGF was further synthesized through the photothermal laser process (Step (b) in FIG. 1). Unlike conventional graphene synthesis methods, the photothermal laser approach is a controllable laser irradiation technology. In particular, the magnitude of the incident light is determined according to the type, size, and operation variable to control the local temperature region of the laser.

Under the photothermal irradiation of the 10.6 μm $CO_2$ laser, the temperature rises within the focused area of the laser (>2500° C.), which breaks the covalent bond between the carbon atoms in fPI NFs. At the same time, the gaseous molecules of $H_2$, $N_2$, $O_2$, and F are evaporated to form the pores in the fibrous structures of the graphene. LIGF with NFs structures and heterogeneous micro/nano-scale pores is formed as a result of the rearrangement of the aromatic compound and dischargement of gaseous products.

The parameters for optimization of LIGF include two parts: 1) forming uniformly sized and shaped nanofibers and 2) laser parameters to synthesize high-performance LIGF from fPI NFs. Variables for the synthesis of fPI NFs through the electrospinning technique can be assorted to external environmental and internal parameters. The concentration of the fluorinated poly(amic)acid solution played a role in fPI NFs formation during the electrospinning process.

Figure 2A:
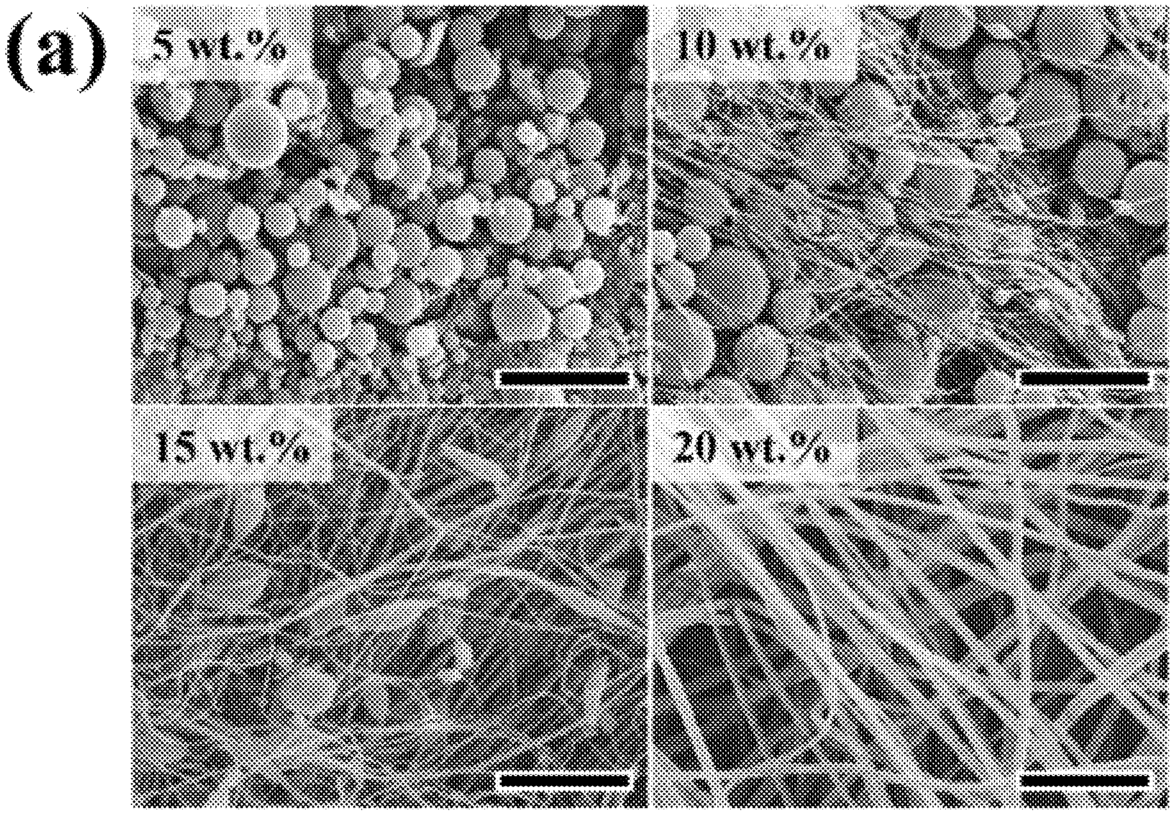
FIG. 2A shows SEM images of electrospun poly(amic) acid nanoparticles or nanofibers under various solution concentrations with scale bars indicating 10.0 μm.

FIG. 2A shows the SEM images of the electrospun fluorinated poly(amic)acid NFs from four different concentrations of 5 wt. %, 10 wt. %, 15 wt. %, and 20 wt. % fluorinated poly(amic)acid solution. The SEM image from the low concentration of 5 wt. % showed fPI nanoparticles rather than nanofibers owing to the high surface tension of the solution, called as electrospraying process. The SEM images from the concentration of 10 wt. % and 15 wt. % showed beaded nanofibers with spherical beads and spindle-like beads, respectively. The bead formation is attributable to Laplace pressure generated by the gradient between spindle-knots and joints, in which the energy of a single nanofiber produced the driving force of condensed beads. The SEM image of the electrospun NFs from the concentration of 20 wt. % fluorinated poly(amic)acid solution revealed smooth and uniform NFs. Therefore, the precursor concentration of 20 wt. % was obtained as an optimal parameter of the electrospinning approach to form smooth and uniform fluorinated poly(amic)acid NFs.

Figure 2B:
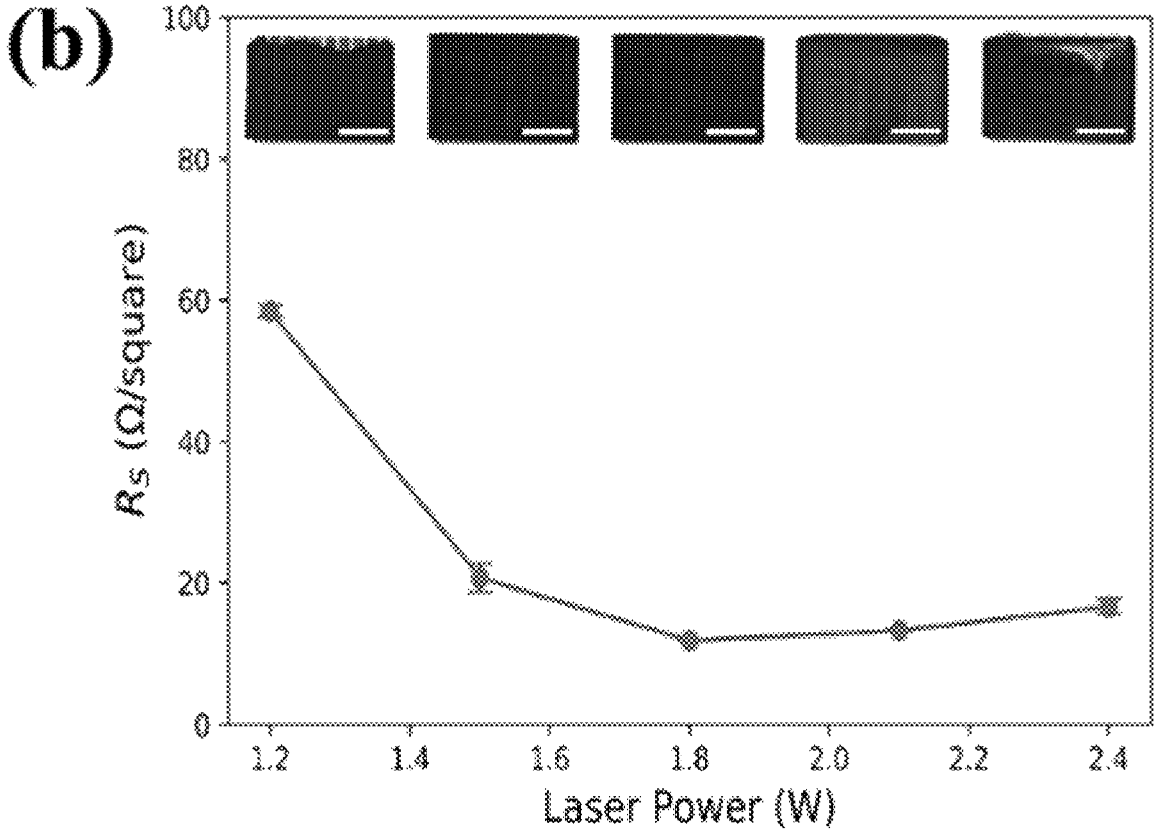
FIG. 2B shows sheet resistance ($R_s$) values of fabricated LIGF at various laser power parameters with their optical images. All scale bars of optical images indicate 1.0 mm.

To optimize the laser setting parameters for LIGF generation from electrospun fPI NFs, fPI NFs were graphitized at different laser powers, speeds, and PPI using the photothermal laser graphitization approach. The sheet resistance was measured to represent the electrical conductivity of LIGF. The sheet resistances ($R_s$) were measured of the LIGF synthesized at laser powers from 1.2 W to 2.4 W in 0.15 W increments, a scan rate of 3.5 inches $s^{-1}$, and 1000 pulse per inch (PPI). The lowest $R_s$ was obtained from LIGF-1.8 W, indicating that laser power of 1.8 W provides the highest conductivity (FIG. 2B). The fPI NFs was not fully carbonized at a laser power of 1.2 W, indicating the low laser power of 1.2 W for graphitization (inset of FIG. 2B).

Figure 2C:
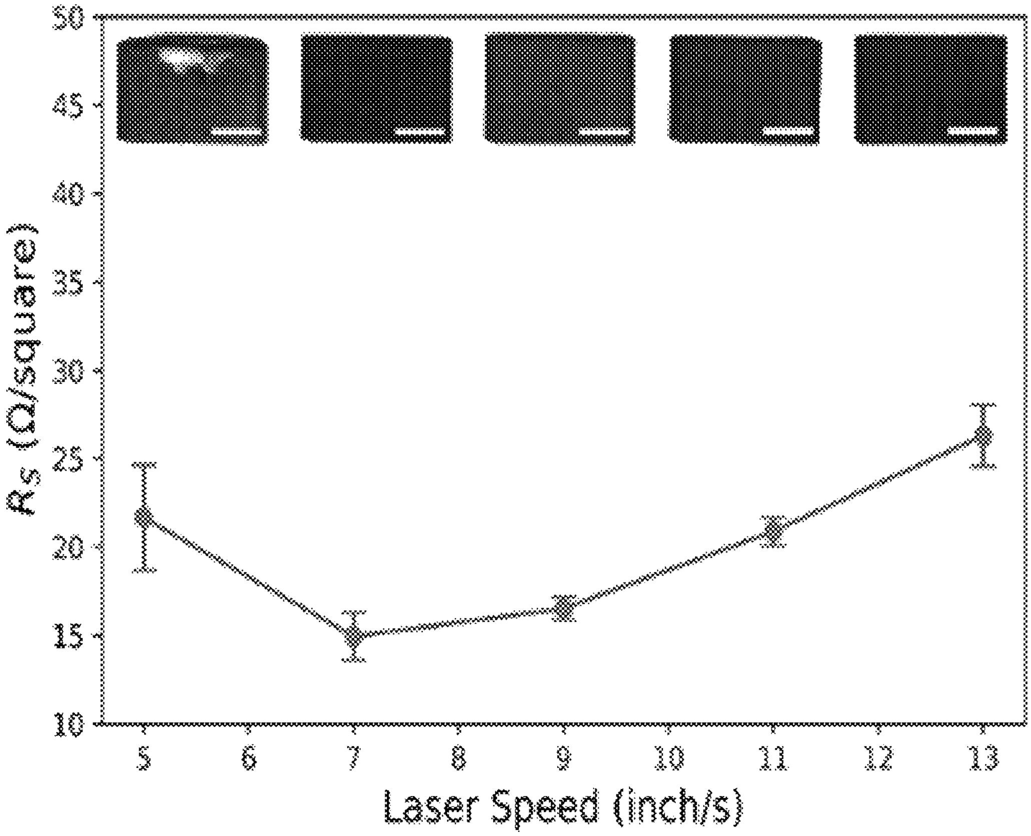
FIG. 2C shows sheet resistance ($R_s$) values of fabricated LIGF at various laser speed parameters with their optical images. All scale bars of optical images indicate 1.0 mm.
Figure 2D:
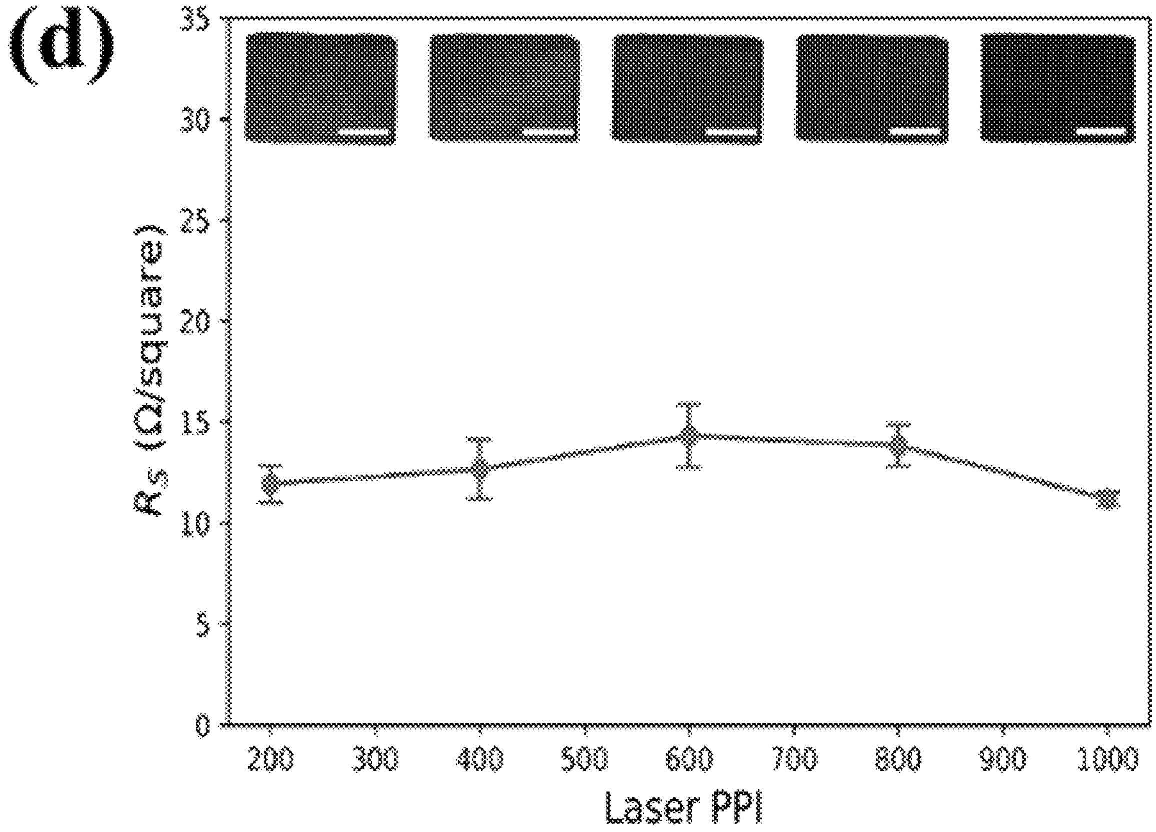
FIG. 2D shows sheet resistance ($R_s$) values of fabricated LIGF at various PPI with their optical images. All scale bars of optical images indicate 1.0 mm.

In addition, LIGF-2.4 W showed flake and cracked graphene film, indicating that the high thermal power of 2.4 W deteriorates the quality of the film (inset of FIG. 2B). The $R_s$ was measured at different scan rates between 1.5-6.5 inches $s^{-1}$, constant laser power of 1.8 W, and 1000 PPI, showing the lowest $R_s$ of ~15Ω at a scan rate of 3.5 inches $s^{-1}$ (FIG. 2C). PPI played a negligible role in changing the $R_s$ as shown in FIG. 2D. The optical images of fabricated laser graphitized nanofibers under various laser parameters and I-V measurements were also conducted on the LIGF, revealing consistent results with $R_s$. The results of electrical characterization using both I-V and $R_s$ measurements indicate that the optimized laser condition to form LIGF from fPI NFs is a laser power of 1.8 W, a scan rate of 3.5 inches $s^{-1}$, and 1000 PPI. Other suitable parameters are contemplated however, and these are not intended to be limiting.

Figure 3A:
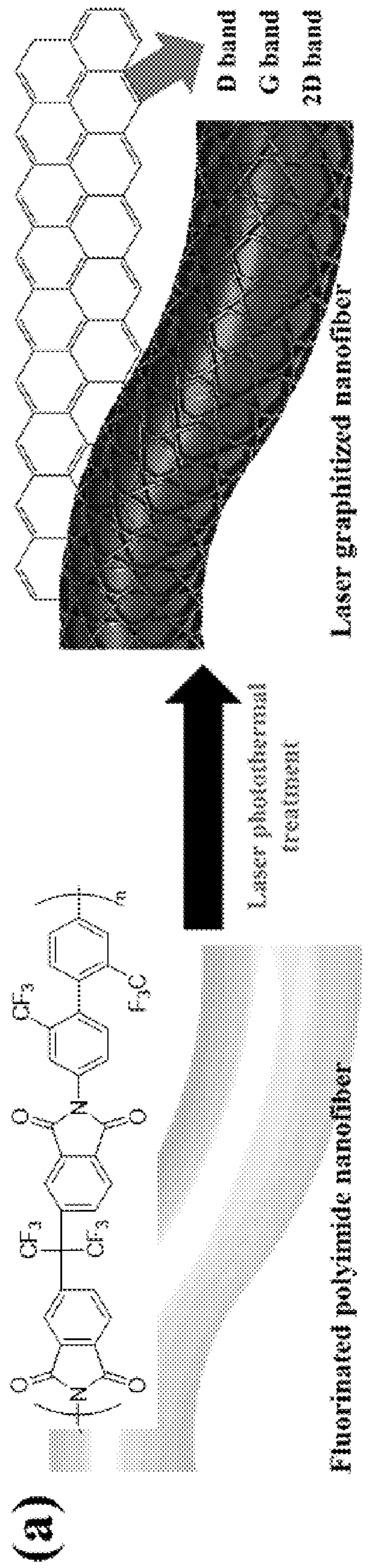
FIG. 3A shows a schematic illustration of the morphological and molecular structural change to the nanofiber after photothermal laser treatment.
Figure 3B:
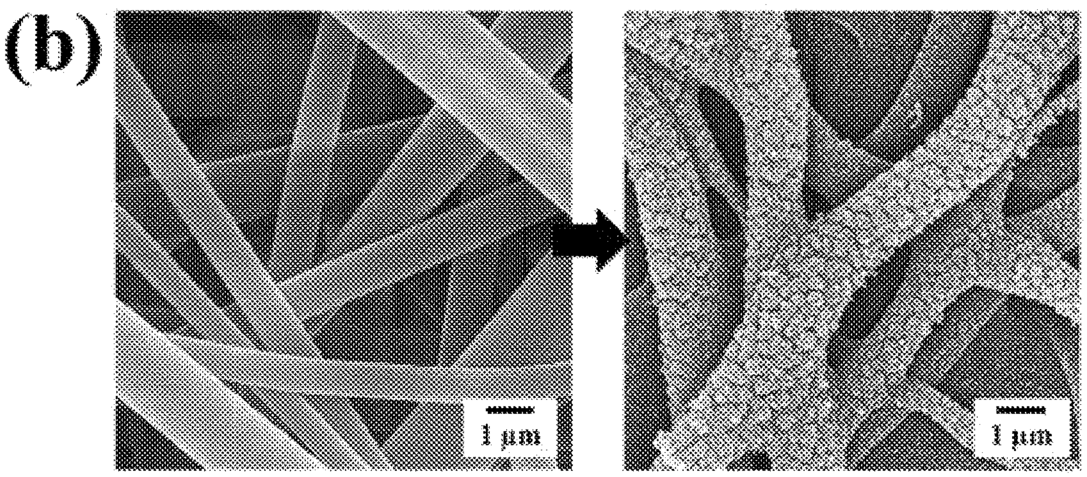
FIG. 3B shows SEM images of the nanofiber before and after photothermal laser treatment and FIG. 3C shows TEM images of the nanofiber before and after photothermal laser treatment.

Material characterization was conducted on the morphological and molecular structures of the LIGF that was synthesized through photothermal laser treatment (FIG. 3A). SEM images of fPI NFs and LIGF show smooth and uniform NFs and roughened graphene, respectively (FIG. 3B). Graphite granules on the surface of laser-graphitized nanofibers is a result of the agglomeration of graphene particles during the photothermal laser treatment, indicating graphene formation on nanofibers. The size of nanofibers was not affected by the laser as diameters for fPI NFs (948.18±286.24 nm) and LIGF (930.80±261.72 nm) were similar SEM analysis of LIGF under various laser power range from 1.5 W to 2.1 W was further verified that a smaller amount of graphene granules were formed at low laser power (1.5 W) while the nanofiber structure deteriorated at higher laser power (2.1 W).

The qualitative analysis further proceeded through EDS and mapping analysis, which showed the presence of C, O, N, and F elements with atomic ratio of increased carbon and decreased fluorine after photothermal laser treatment as shown in Table 1.

TABLE 1

| Element | Atomic % (Before Laser Treatment) | Atomic % (After Laser Treatment) |
|---|---|---|
| C | 45.07 | 58.74 |
| O | 7.82 | 8.52 |
| N | 10.19 | 10.92 |
| F | 36.92 | 21.82 |

Figure 3C:
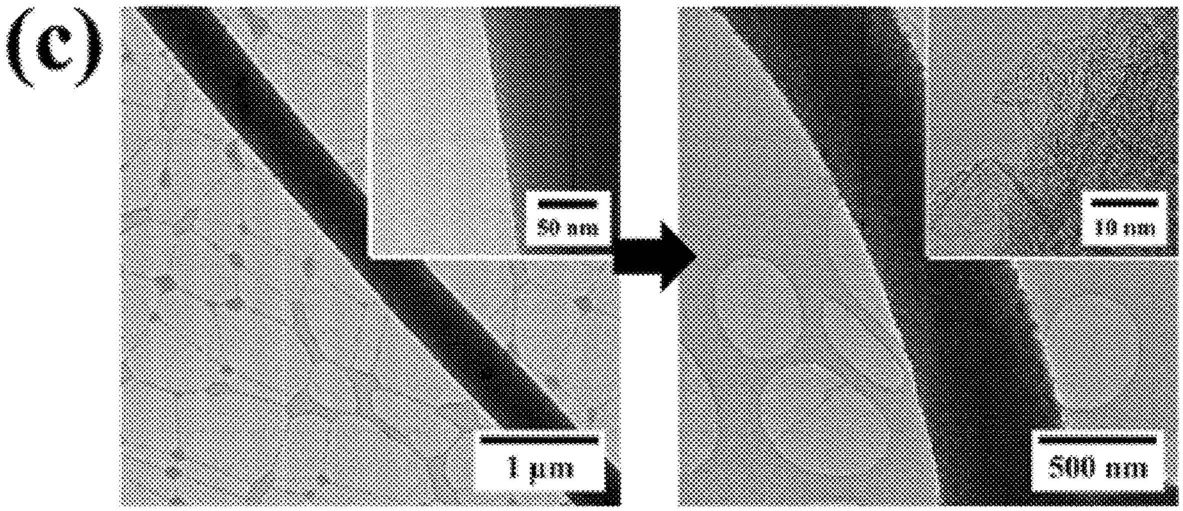

TEM images of both fPI NFs and LIGF indicated the perpendicular-oriented graphene sheets were formed after photothermal laser treatment (FIG. 3C). LIGF showed a lattice spacing of 0.36 nm under high resolution, indicating the presence of the adjacent graphene layer. The 0.36 nm lattice spacing was all shown under various laser powers with graphene nanofibers ablation under laser power above 2.1 W. Therefore, morphological characterizations through SEM and TEM images verified high-quality LIGF was formed from fPI NFs through a photothermal laser process at a laser power of 1.8 W.

Figure 3D:
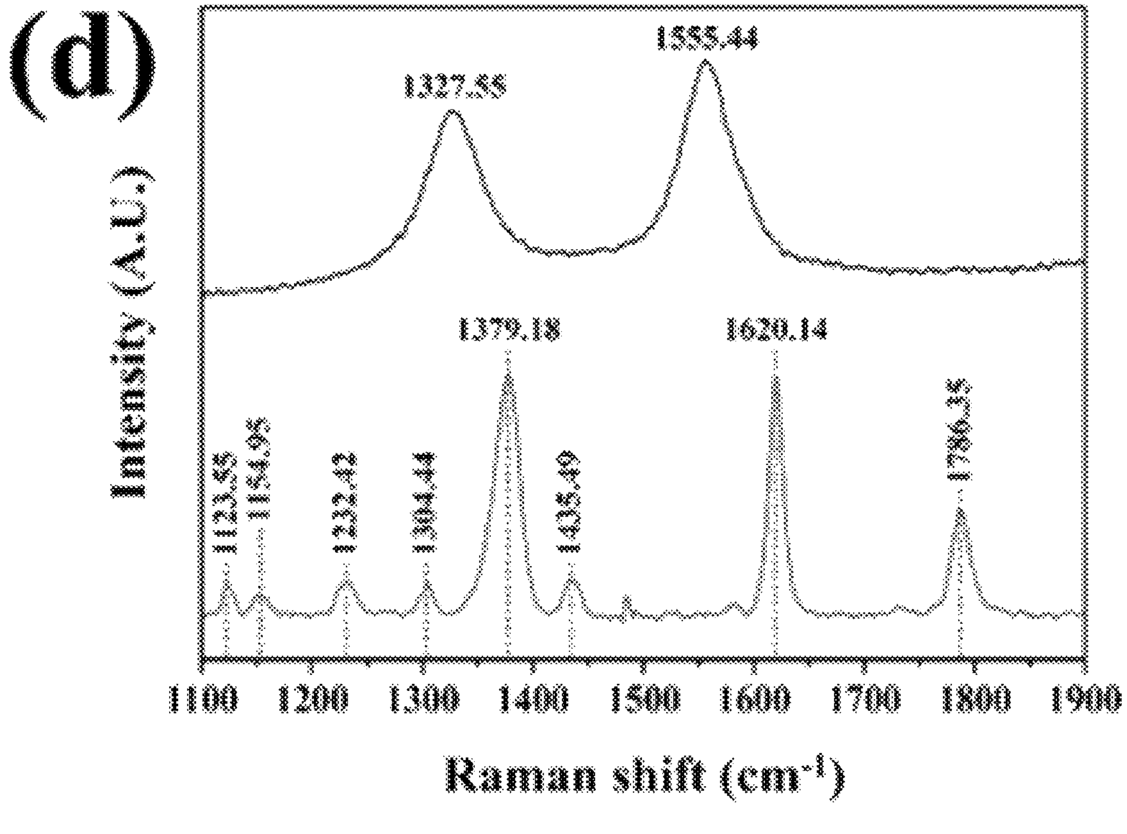
FIG. 3D shows raman spectra of fPI NFS and LIGF under a range of 1100 to 1900 $cm^{-1}$.
Figure 3E:
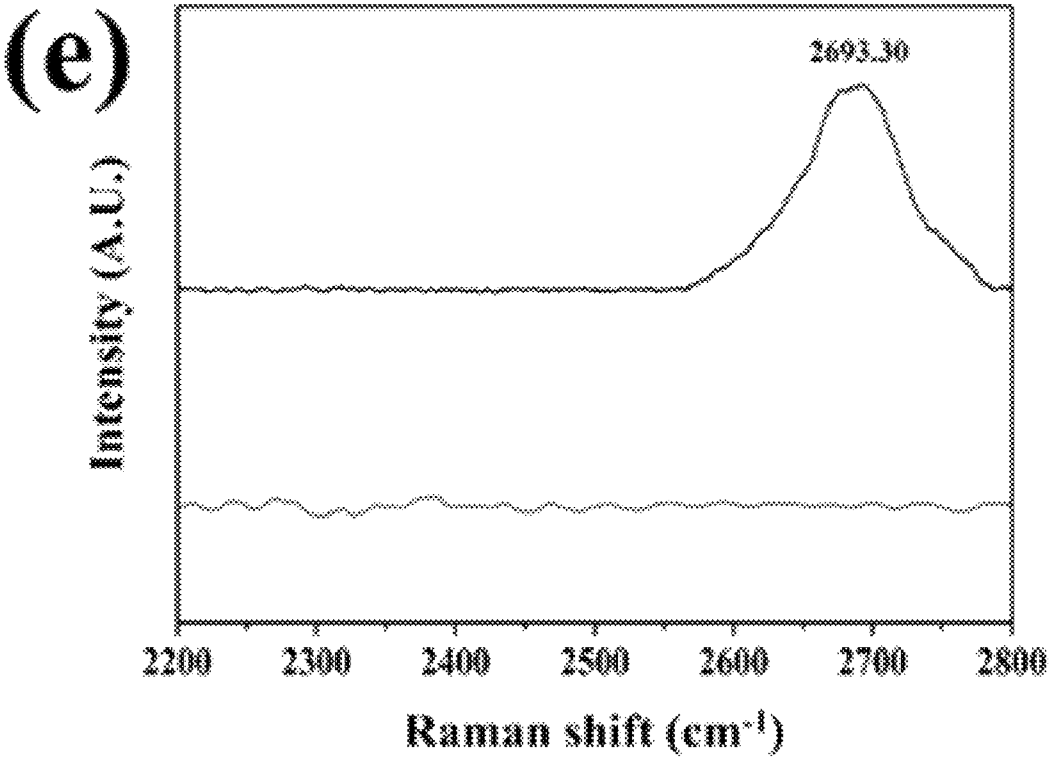
FIG. 3E shows raman spectra of fPI NFS and LIGF under a range of 2200 to 2800 $cm^{-1}$.
Figure 3F:
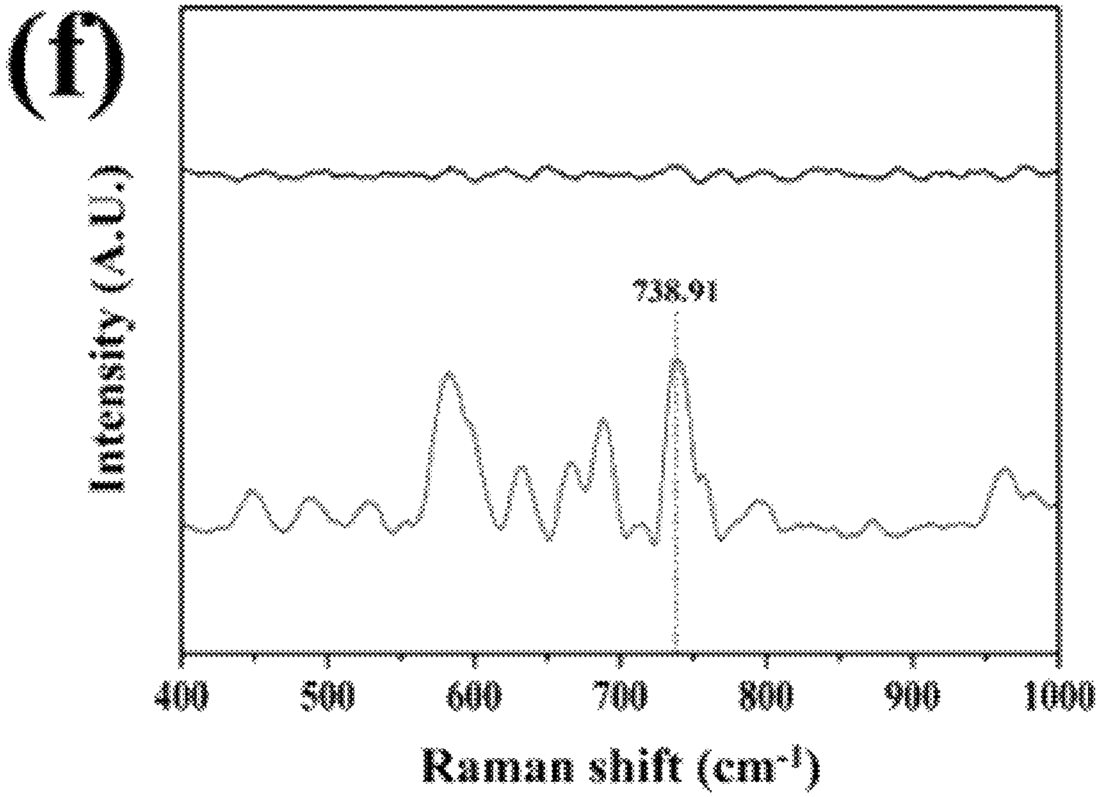
FIG. 3F shows raman spectra of fPI NFS and LIGF under a range of 400 to 1000 $cm^{-1}$.

To investigate the structure of NFs before and after laser graphitization, Raman spectroscopy was performed. Two peaks of fPI NFs at 1154.95 and 1620.14 $cm^{-1}$ are due to the benzene ring in the polyimide backbone (FIG. 3D). Other peaks at 1123.55, 1232.42, 1304.44, 1379.18, 1435.49, and 1786.35 $cm^{-1}$ are attributable to C—N—C stretching, CH deform, $CH_2$ twist, axial C—N—C stretching, $CH_2$ bend, and in-plane C═O stretching, respectively, (FIG. 3D), which are all related to polymer chains of fPI NFs. Comparably, LIGF showed two clear peaks at 1327.55 and 1555.44 $cm^{-1}$, indicating the D band and G band. Intensity ratios of $I_D/I_G$ ratio were compared for LIGF synthesized at different laser powers from 1.5 W to 2.1 W. D band intensity was higher for the LIGF-1.5 W, indicating the presence of more $sp^3$ bonds. G band intensity was higher for the LIGF fabricated at higher laser powers of 1.8 W, indicating the formation of $sp^2$ domains and π bonded C═C networks. LIGF also displayed a peak at 2693.30 $cm^{-1}$, called the 2D band, signifying the formation of stacked multi-layer graphene (FIG. 3D). The sharp 2D peak of the LIGF-1.8 W (FIG. 3E) indicates its higher degree of graphitization compared to the other LIGF fabricated at laser powers of 1.5 and 2.1 W. Another characteristic peak appeared at 738.91 $cm^{-1}$ only for fPI NFs, indicating the symmetrical vibration of C—F (FIG. 3F). The disappearance of this specific peak in LIGF verified that the C—F bond in fPI NFs was graphitized and vaporized during photothermal laser treatment. Results of Raman spectroscopy confirm that LIGF-1.8 W has a higher degree of graphitization and the C—F bond in fPI NFs was evaporated after graphitization.

Figure 3G:
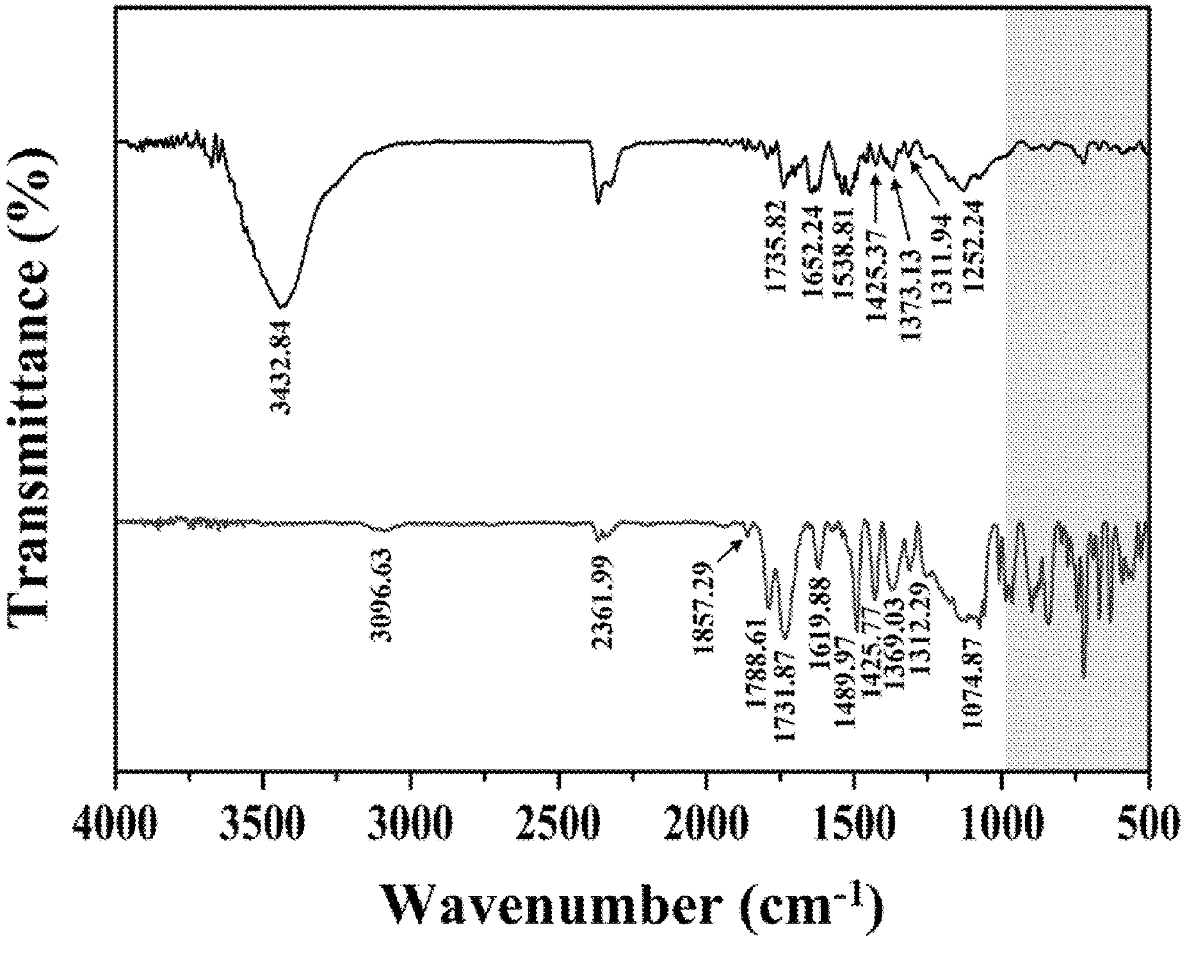
FIG. 3G shows FT-IR spectra of fPI NFs and LIGF.

FT-IR spectrums of LIGF and fPI NFs were also performed to investigate the different chemical bonds and functional groups (FIG. 3G). fPI NFs showed two adsorption peaks at 1942.41 and 1857.29 $cm^{-1}$, relating to the bending mode of the C—H bond. Moreover, two peaks of fPI NFs at 1788.61 and 1731.87 $cm^{-1}$ and one characteristic peak of LIGF at 1735.82 $cm^{-1}$ were all associated with the stretching mode of C═O bonds (FIG. 3G). In addition, the spectra of benzene rings for both fPI NFs and LIGF were shown in the range from 500.00 $cm^{-1}$ to 1000.00 $cm^{-1}$ and 1619.88 $cm^{-1}$, indicating the C═C bending and C═C stretching, respectively. Finally, peaks centered at approximately 1369.03 $cm^{-1}$ and 1312.29 $cm^{-1}$ in fPI NFs is attributable to the stretching vibration of the C—F bond. The stretching vibration peaks were also observed in laser-graphitized NFs at 1373.13 $cm^{-1}$ and 1311.94 $cm^{-1}$ with weaker peak intensity, verifying that most $CF_3$ bonds in fPI NFs were vaporized during photothermal laser treatment. Notably, fabricated LIGF fabricated at different laser powers from 1.5 to 2.1 W showed similar peaks, indicating that the laser power has a negligible role in the chemical bonds and functional groups of graphitization.

Figure 3H:
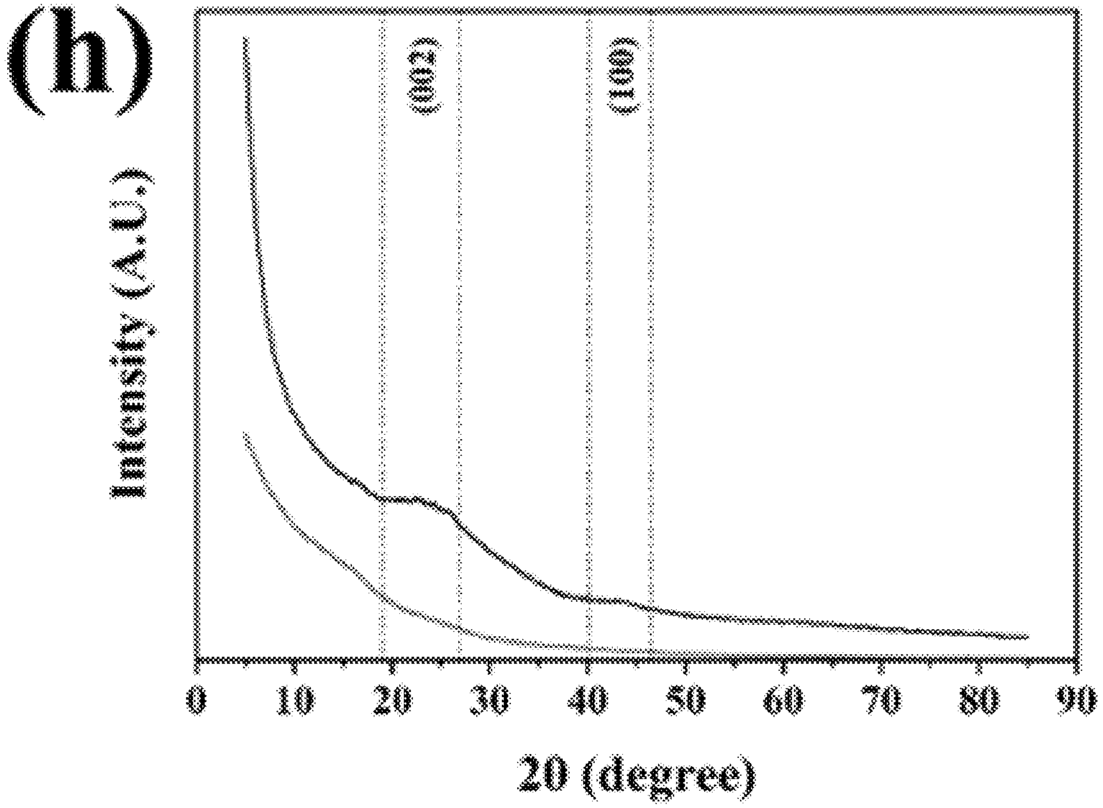
FIG. 3H shows XRD spectra of fPI NFs and LIGF.
Figure 3I:
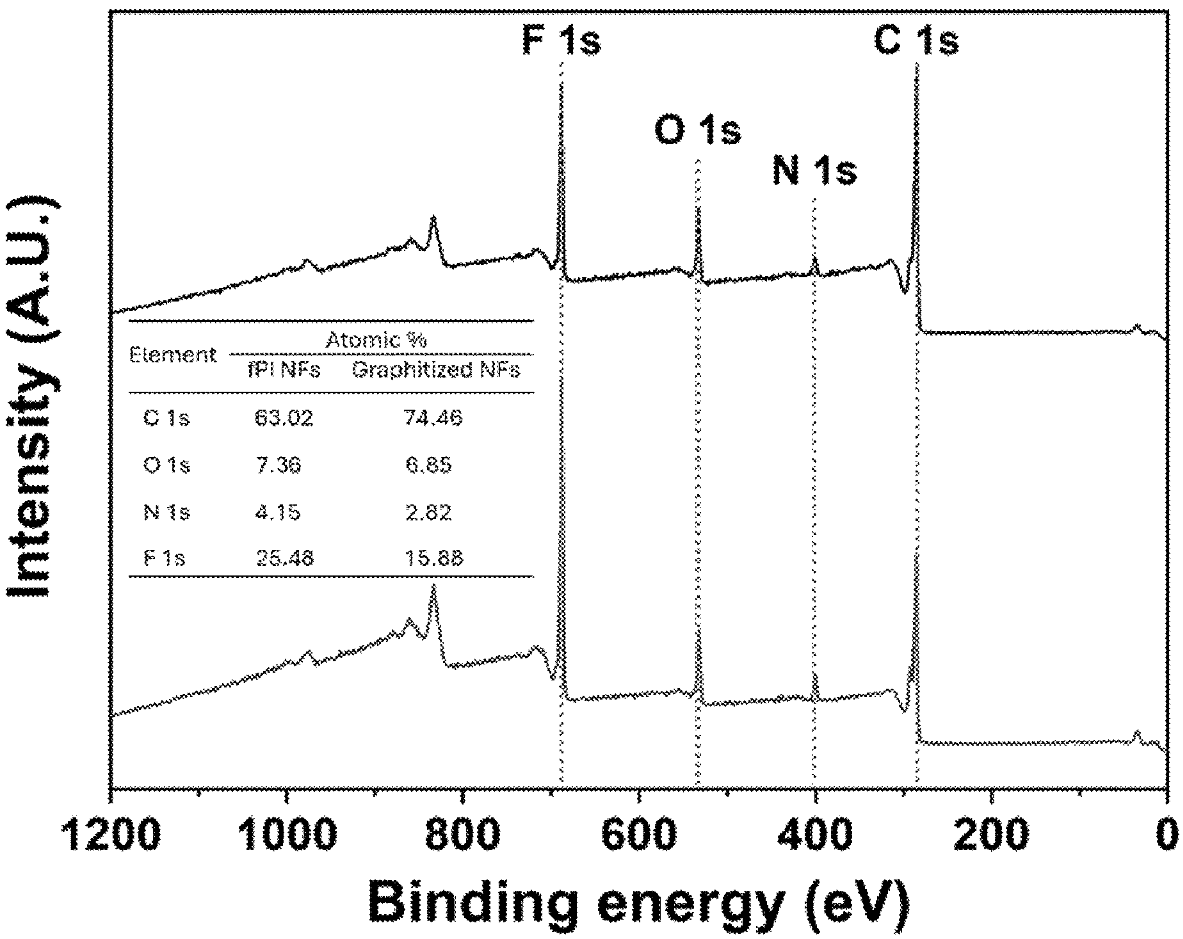
FIG. 3I shows wide scan XPS spectra of fPI NFs and LIGF.

To evaluate the crystallinity, chemical composition, and thermal stability of the LIGF, XRD and XPS, and TGA analyses were conducted. XRD of the fPI NFs did not show a specific peak, indicating its amorphous solid structure. Comparably, LIGF showed two broad characteristic peaks at the 2θ values of 24.46° and 43.46°, which are precisely indexed to the (002) and (100) crystal planes, respectively (FIG. 3H). The (002) crystal plane was consistent with a lattice spacing of 0.36 nm in the TEM result, and the (100) diffraction peak was related to a d-spacing of 2.13 Å, confirming that graphene was formed through photothermal laser treatment.

The XPS spectra of LIGF reveal characteristics peaks of C1s with an atomic ratio of 74.46% and F1s with an atomic ratio of 15.88%, centered at 284.79 and 688.46 eV, respectively with negligible O1s and N1s, indicating predominant C—C bonds in the graphene fibers (FIG. 31). The reduced atomic ratio of F from 25.48% to 15.88% after photothermal laser treatment indicates the evaporation of fluorine during laser graphitization. Five characteristic peaks at 284.79, 284.93, 285.63, 288.14, and 292.43 eV are attributable to the $sp^2$ carbon, $sp^3$ carbon, C—O—C, O—C═O, and $CF_3$, respectively. Two peaks centered at 532.08 and 533.20 eV are attributed to the binding energies of C═O and C—O, respectively, while the peaks at ~400.43 and 400.52 eV are ascribed to the characteristic $NH_2$ and C—N, respectively. Finally, the F1s spectrum showed two peaks at 688.46 and 689.77 eV, indicating semi-ionic and covalent C—F bonds.

The TGA results show that the decomposition of the fPI NFs and LIGF occurred during two stages. The first-stage decomposition started from room temperature to 486.97° C. with a mass loss of ~2.14% and 4.37% for fPI NFs and LIGF, respectively as a result of the loss of absorbed water molecules. The second stage started from a temperature of 486.97° to 581.25° C. for fPI NFs with a mass loss of 91.31% due to the sudden separation of polymer chains. Comparably, the second-stage decomposition of LIGF started from temperature 486.97° C. to 629.48° C. with 35.74% weight loss due to the decomposition of carboxylic and release of $CO_2$ gas. LIGF showed a weight loss of 53.01% even at a high temperature of 900° C., indicating the higher thermal stability of the fibrous structure after photothermal laser treatment. The results of XPS, XRD, and TGA corroborate the conversion of fPI NFs to LIGF and the high thermal stability of graphene fibers after photothermal laser treatment of fPI NFs.

F. LIGF-based Microsupercapacitors (LIGF-MSCs)

Figure 4A:
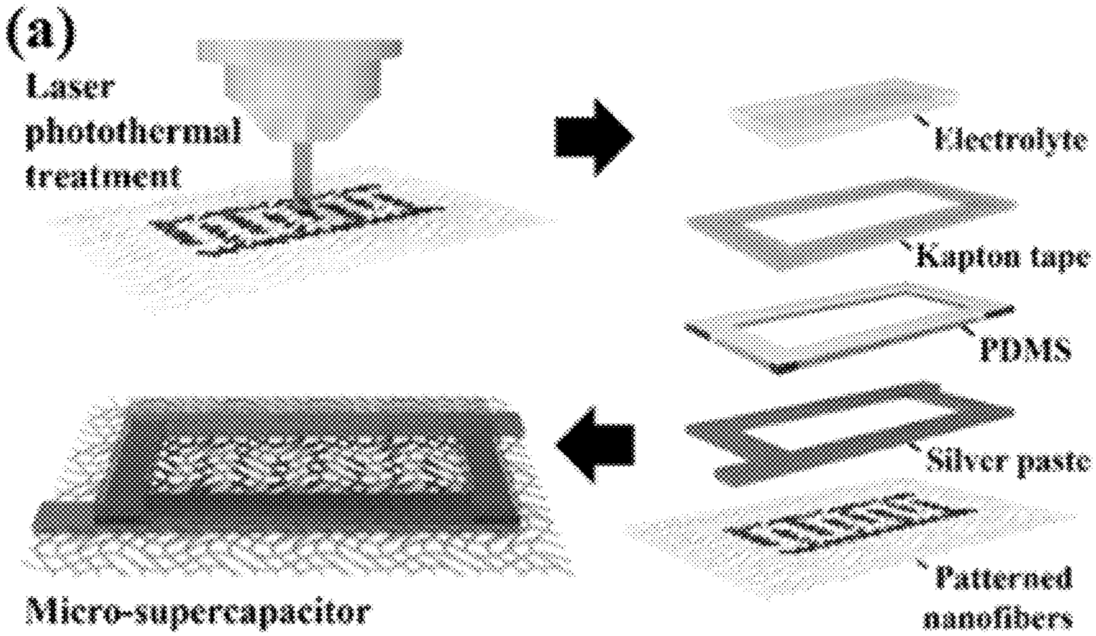
FIG. 4A is a schematic illustration of the LIGF-microsupercapacitor (MSC).
Figure 4B:
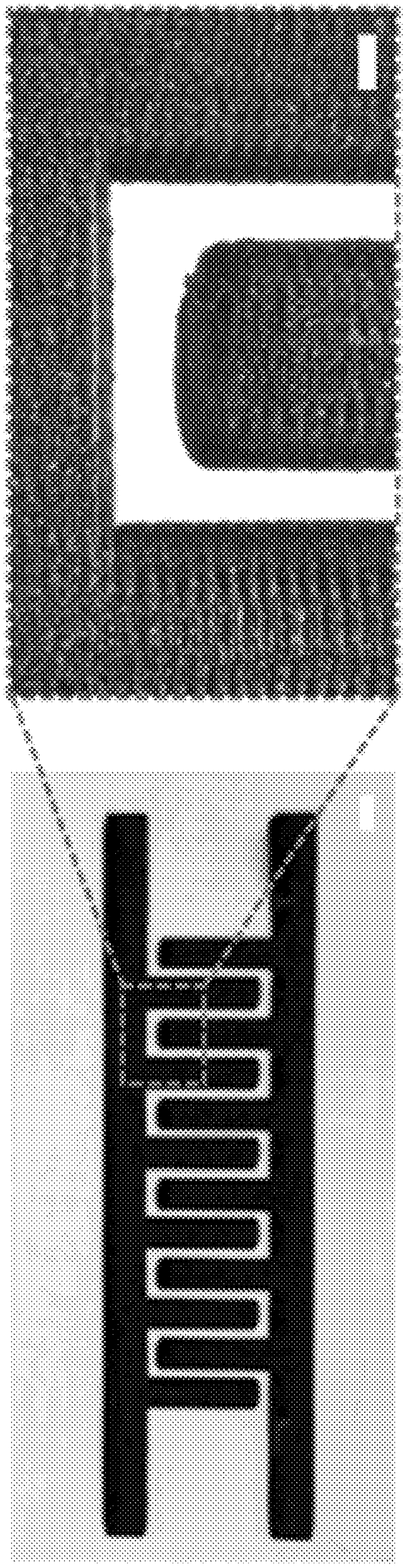
FIG. 4B is a digital photograph of the LIGF-MSC with 12 interdigital electrodes. The inset is the optical microscope image of the LIGF; the scale bar is 1 mm.

To demonstrate the potential of LIGF as an energy storage material, LIGF-based microsupercapacitors (LIGF-MSCs) were built in the symmetrical interdigitated two-electrode mode, where LIGF acts as both the electrodes and the current collectors. LIGF-MSC were directly engraved on fPI NFs with a neighboring distance of 300 μm (FIG. 4A). The silver paste was then employed on positive and negative electrodes, followed by applying PDMS and Kapton tape to define the active electrodes. The photograph of the fabricated LIGF-MSC is displayed in FIG. 4B.

Figure 4C:
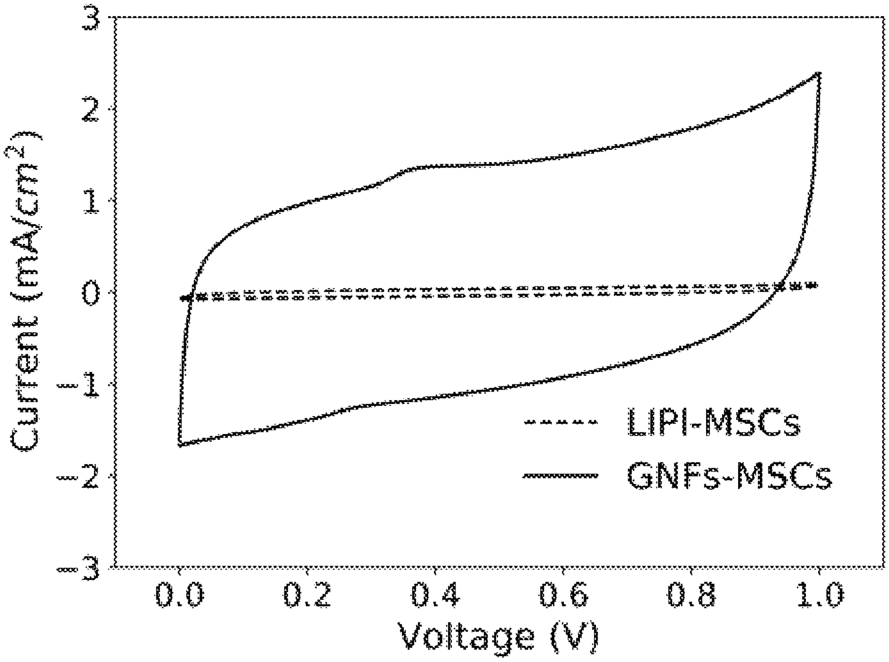
FIG. 4C shows CV curves of PI-LIG and LIGF-MSCs in 1M $H_2SO_4$ at a scan rate of 100 mV $s^{-1}$.
Figure 4D:
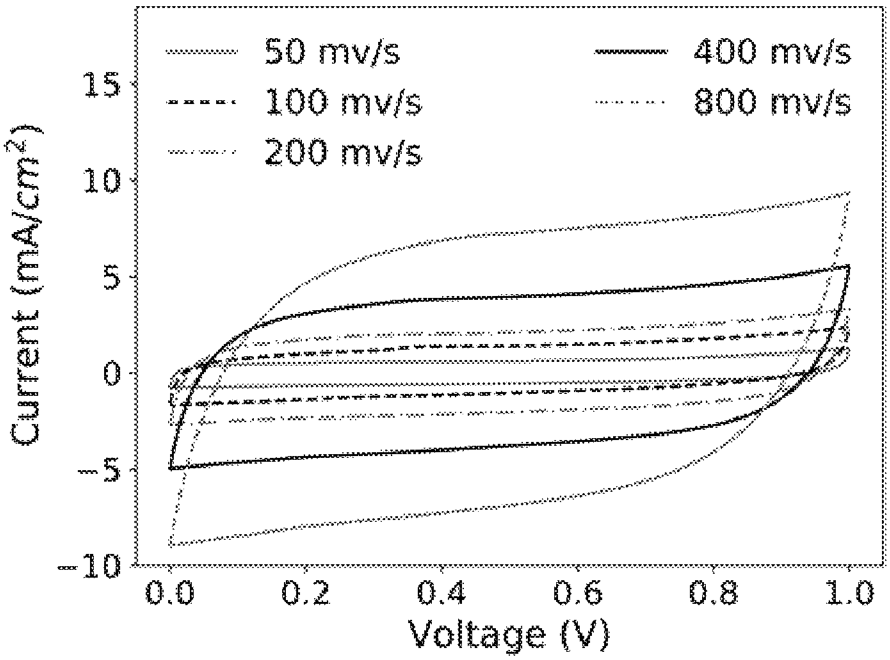
FIG. 4D shows CV curves of LIGF-MSC at scan rates from 50 to 800 mV $s^{-1}$.
Figure 4E:
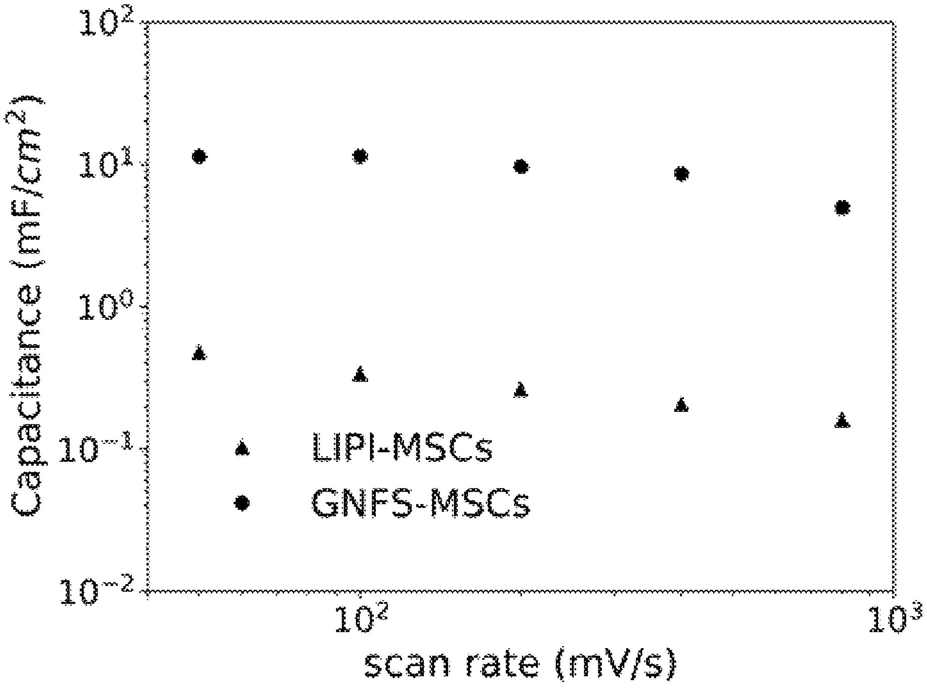
FIG. 4E shows a plot of specific areal capacitance ($C_A$) of PI-LIG and LIGF-MSCs calculated from CV curves as a function of scan rates.

Cyclic voltammetry (CV) measurements were conducted on LIGF-MSC and LIG derived from PI film (PI-LIG) using 1M $H_2SO_4$ aqueous electrolyte. The rectangular curves in the potential window of 0-1 V indicate their ideal electrical double-layer capacitive (EDLC) behaviors (FIG. 4C). CV curves of LIGF-MSC at different scan rates from 50 to 800 mV $s^{-1}$ also maintain a rectangular shape (FIG. 4D). The specific areal capacitance ($C_A$) of LIGF-MSC and PI-LIG-MSC at different scan rates is shown in FIG. 4E. At a scan rate of 100 mV $s^{-1}$, the $C_A$ of LIGF-MSC was 11.41 mF $cm^{-2}$, which was 33 times higher than that of PI-LIG-MSC (0.34 mF $cm^{-2}$) and comparable with or higher than that of EDLC-type MSCs. The nearly 33-fold $C_A$ enhancement is attributable to synergistic effects of the large specific surface area as a result of fibrous structures, and microporous structures. Large specific surface area enhances the ions-matter interaction and microporous structures facilitate electrolyte ion diffusion onto the surface of LIGF electrodes, leading to a high amount of charge accumulation.

Figure 4F:
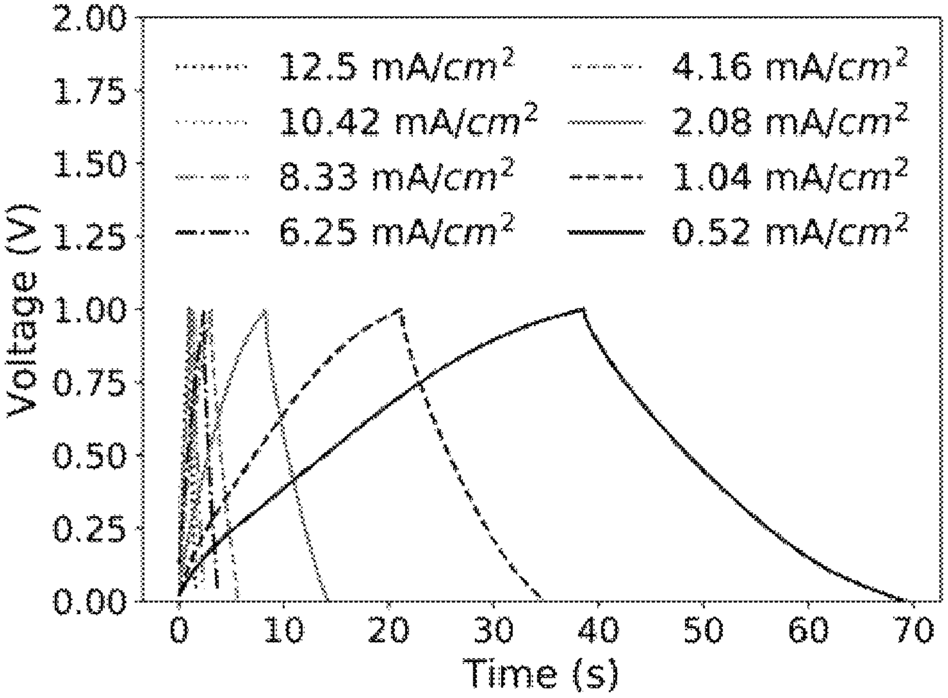
FIG. 4F shows CC curves of LIGF-MSC at discharge current densities ($I_D$) varied from 0.5 to 12.5 mA $cm^{-2}$.
Figure 4G:
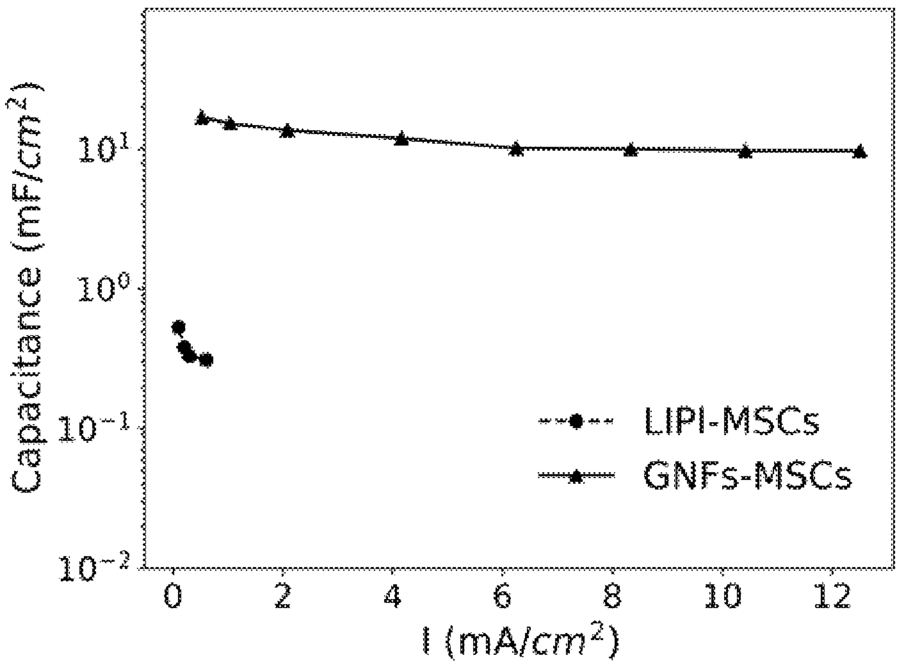
FIG. 4G shows the $C_A$ of PI-LIG and LIGF-MSCs calculated from CC curves versus $I_D$.

The excellent capacitive behavior of LIGF-MSC was further confirmed by the nearly triangular CC curves at different currents from 0.52 to 12.5 mA $cm^{-2}$ (FIG. 4F). The LIGF-MSC provides $C_A$ of ~16.8 mF $cm^{-2}$ at a current of 0.52 mA $cm^{-2}$ and maintained 73% of its low-current areal capacitance (9.7 mF $cm^{-2}$) even at the high current of 12.5 mA $cm^{-2}$, signifying its high rate-retention capability (FIG. 4G). This $C_A$ is comparable to or higher than that of EDLC-type MSCs at the same currents.

Figure 4H:
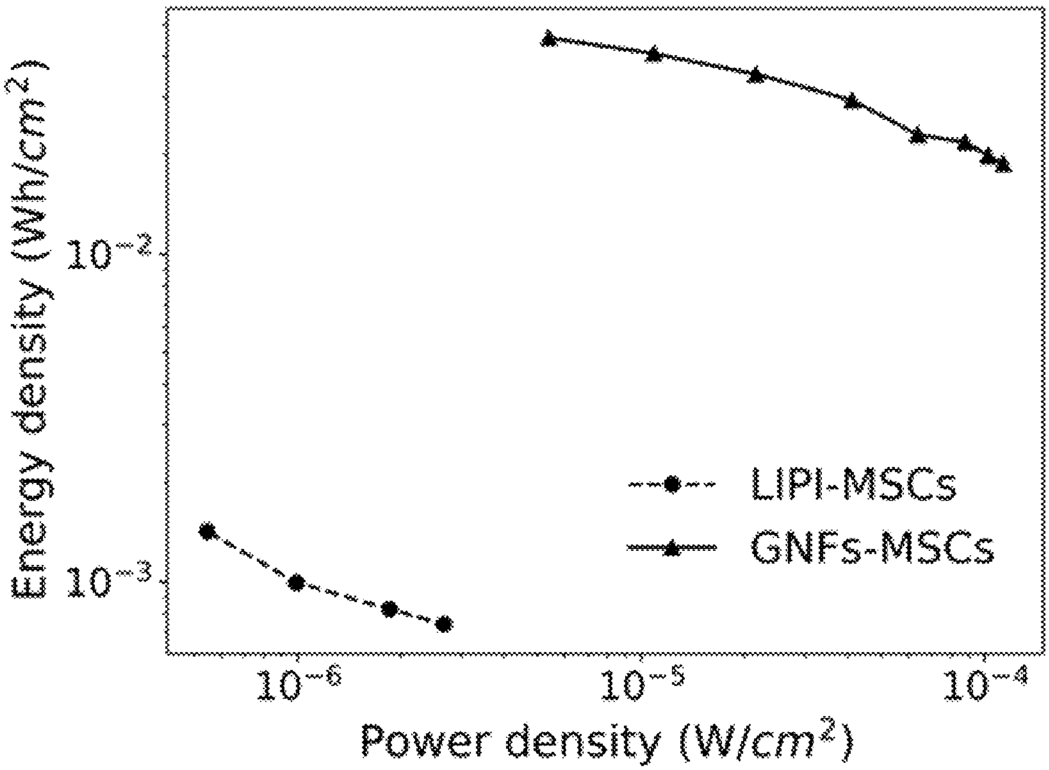
FIG. 4H shows areal energy and power densities of PI-LIG and LIGF-MSCs.

FIG. 4H shows the Ragone plots of LIGF-MSC and PI-LIG-MSC. The energy density of LIGF-MSC was determined to be 0.002 mW h $cm^{-2}$ at a power density of 0.54 mW $cm^{-2}$. This value is nearly two orders of magnitude higher than that of PI-LIG-MSC and at least one order of magnitude higher than EDLC-type MSCs (using 1 M $H_2SO_4$ as the aqueous electrolyte). $C_A$, energy density, and power density of laser-induced graphene from fluorinated polyimide films (fPI-LIG) were also examined by conducting CV and CC measurements. The capacitive performance of the fPI-LIG is similar to LIGF-MSC, indicating that their specific surface areas are possibly in the same order of magnitude. The ~33-fold superior specific areal capacitance of LIGF-MSC and fPI-LIG compared with PI-LIG is mainly due to large specific surface area as a result of fibrous and microporous structures.

In sum, graphene fibers from electrospun fPI NFs have been prepared using combined techniques of electrospinning and photothermal laser graphitization. The fibrous and microporous structure of LIGF, resulting from electrospun fPI NFs precursor and evaporation of the fluorine during laser graphitization, allowed for the enhancement of specific surface area. The resultant LIGF structures possess unique physical and chemical properties, making them ideal for use as energy storage devices. The LIGF-MSC showed a high areal capacitance of 16.8 mF $cm^{-2}$, which is more than one order of magnitude higher than PI-LIG-MSC. The enhanced capacitance is likely due to the fibrous structure of the LIGF which facilitates the electrolyte diffusion into the surface of the materials and allows for the accumulation of more amounts of charge. The excellent electrochemical performance of the LIGF renders them a suitable material for the development of high-performance electrochemical sensors and other applications.

Features and advantages of this disclosure are apparent from the detailed specification, and the claims cover all such features and advantages. Numerous variations will occur to those skilled in the art, and any variations equivalent to those described in this disclosure fall within the scope of this disclosure. Those skilled in the art will appreciate that the conception upon which this disclosure is based may be used as a basis for designing other compositions and methods for carrying out the several purposes of this disclosure. As a result, the claims should not be considered as limited by the description or examples.

What is claimed is:

1. A graphene fiber prepared from a fluorinated polyimide fiber which has at least one aromatic ring, wherein the graphene fiber retains residual fluorine from a precursor polyamic acid fiber or the fluorinated polyimide fiber, evident by infrared (IR) spectroscopy as C—F stretching vibration peaks, wherein the graphene fiber is formed by electrospinning the precursor polyamic acid fiber, followed by thermal imidization to form the fluorinated polyimide fiber, and subsequent photothermal laser graphitization of the fluorinated polyimide fiber; wherein the precursor polyamic acid fiber has one of the following repeating units:

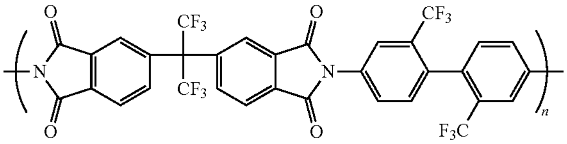

,

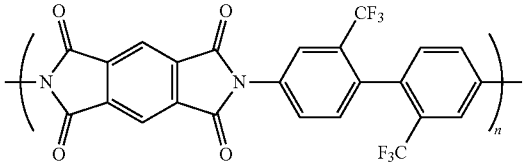

, or

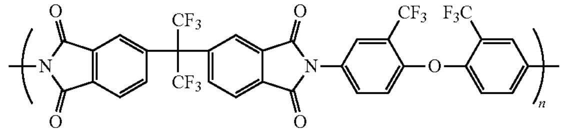

, where each instance of n is independently an integer that is at least two.

2. The graphene fiber of claim 1, wherein the graphene fiber has nanopores with an average pore size of less than 100 nm and wherein the graphene fiber has a BET specific surface area of at least 300 $m^2/g$.

3. A capacitor having a first electrode comprising a graphene fiber prepared from a fluorinated polyimide fiber having at least one aromatic ring, wherein the graphene fiber retains residual fluorine from a precursor polyamic acid fiber or the fluorinated polyimide fiber evident by infrared (IR) spectroscopy as C—F stretching vibration peaks, wherein the graphene fiber is formed by electrospinning the precursor polyamic acid fiber, followed by thermal imidization to form the fluorinated polyimide fiber, and subsequent photothermal laser graphitization of the fluorinated polyimide fiber; wherein the precursor polyamic acid fiber has one of the following repeating units:

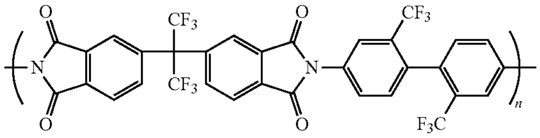

,

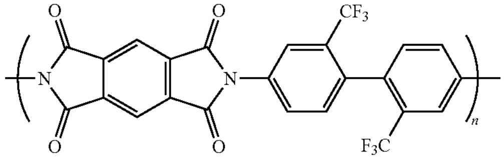

, or

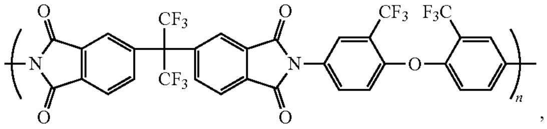

, where each instance of n is independently an integer that is at least two.

4. The capacitor of claim 3, wherein the first electrode is configured interdigitated with a second electrode.

5. The capacitor of claim 3, which is a micro-supercapacitor (MSC).

6. The capacitor of claim 3, wherein the graphene fiber has a diameter of 500-1,500 nm.

* * * * *